United States Patent
Beyer

(10) Patent No.: US 10,728,120 B2
(45) Date of Patent: Jul. 28, 2020

(54) WEIGHTED NODE LAYERING IN GRAPH DRAWING

(71) Applicant: SAP SE, Walldorf (DE)

(72) Inventor: Bertram Beyer, Nussloch (DE)

(73) Assignee: SAP SE, Walldorf (DE)

( * ) Notice: Subject to any disclaimer, the term of this patent is extended or adjusted under 35 U.S.C. 154(b) by 565 days.

(21) Appl. No.: 15/377,396

(22) Filed: Dec. 13, 2016

(65) Prior Publication Data

US 2018/0167289 A1    Jun. 14, 2018

(51) Int. Cl.
| G06F 15/173 | (2006.01) |
| H04L 12/26 | (2006.01) |
| H04L 12/24 | (2006.01) |
| H04L 12/705 | (2013.01) |

(52) U.S. Cl.
CPC ........ *H04L 43/045* (2013.01); *H04L 41/0266* (2013.01); *H04L 45/18* (2013.01)

(58) Field of Classification Search
CPC ....... H04L 43/045; H04L 43/22; H04L 45/18; G06T 11/206
USPC .......................................................... 709/224
See application file for complete search history.

(56) References Cited

U.S. PATENT DOCUMENTS

| 4,953,106 | A | * | 8/1990 | Gansner | ................ | G06T 11/206 345/440 |
| 6,442,584 | B1 | * | 8/2002 | Kolli | .................... | G06F 9/5061 718/104 |
| 8,237,716 | B2 | * | 8/2012 | Kolipaka | .............. | G06T 11/206 345/419 |
| 9,501,849 | B2 | * | 11/2016 | Wong | .................... | G06T 11/206 |
| 2010/0060643 | A1 | * | 3/2010 | Kolipaka | .............. | G06T 11/206 345/440 |
| 2011/0116389 | A1 | * | 5/2011 | Tao | ........................ | H04L 45/18 370/252 |
| 2017/0371970 | A1 | * | 12/2017 | Bharti | ................. | G06F 17/2235 |

OTHER PUBLICATIONS

U.S. Appl. No. 14/305,239, filed Jun. 16, 2014, Schaerges et al.
U.S. Appl. No. 14/188,290, filed Feb. 24, 2014, Osterhoff et al.

* cited by examiner

*Primary Examiner* — Ario Etienne
*Assistant Examiner* — Sahera Halim
(74) *Attorney, Agent, or Firm* — Fish & Richardson P.C.

(57) ABSTRACT

Node information for a set of nodes to display on a graph is identified. The node information includes metadata and relationship information. The relationship information indicates, for each relationship, a source node and a target node for the relationship. Weights for the nodes are determined based on the metadata associated with the nodes. The nodes are sorted based on the determined weights. A first node with a highest weight is assigned to a first layer of the graph. For each given node other than the first node: relationships of the given node to assigned nodes are determined, an assigned layer is determined for the given node based on the determined weights and the relationships of the given node to assigned nodes, and the given node is assigned to the assigned layer.

20 Claims, 12 Drawing Sheets

800

801: #1 (402) sort nodes by weight: [SOURCE, STORE_A, STORE_B, STORE_C, INTERF_A1, INTERF_A2]
802: #2 (408) layer assignment for: SOURCE
803: #2.1 (506) first node
804: #3, #4, #1 (410) [STORE_B, INTERF_A1]
805:    #2 (408) layer assignment for: STORE_B
806:    #2.2 (510), (512) assigned target not found, assigned source found (SOURCE)
807:    #2.4 (528), (530) add new layer at top of graph and add node
808: #3, #4, #1 (410) [STORE_C]
809:    #2 (408) layer assignment for: STORE_C
810:    #2.2 (510), (512) assigned target not found, assigned source found STORE_B
811:    #2.4 (528), (530) add new layer at top of graph and add node
812:    #2 (408) layer assignment for: INTERF_A1
813:    #2.2 (510), (512) assigned target found (STORE_C), assigned source found (SOURCE)
814:    #2.3 (544) add to best layer between STORE_C and SOURCE
815:    #2.3.3 (602), (612) has no weight, calculated node weight is 2
816:    #2.3.5 (618) calculate weight list [1]
817:    #2.3.6 (620) add to new layer below STORE_B
818:#2 (408) layer assignment for: STORE_A
819:#2.2 (510) (512) target found STORE_C, source found INTERF_A1
820:#2.3 (528), (534) add to best layer between STORE_C and INTERF_A1
821:#2.3.1 (602), (604), node has a weight, find layers with most frequent type usage [1]
822:#2.3.2 (606), (608) add node to lowest layer 1
823:#3, #4, #1 (410) [INTERF_A2]
824:   #2 (408)layer assignment for: INTERF_A2
825:   #2.2 (510), (512) target found STORE_C, source found STORE_A
826:   #2.5 (538), (540) add new layer between target and source layer and add node
827:#2 (504) layer assignment for: STORE_A already placed
828:#2 (504) layer assignment for: STORE_B already placed
829:#2 (504) layer assignment for: STORE_C already placed
830:#2 (504) layer assignment for: INTERF_A1 already placed
831:#2 (504) layer assignment for: INTERF_A2 already placed

FIG. 8

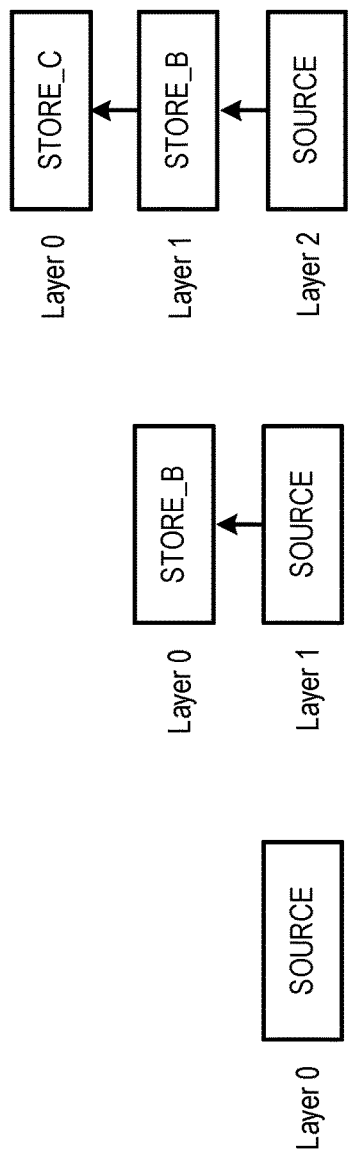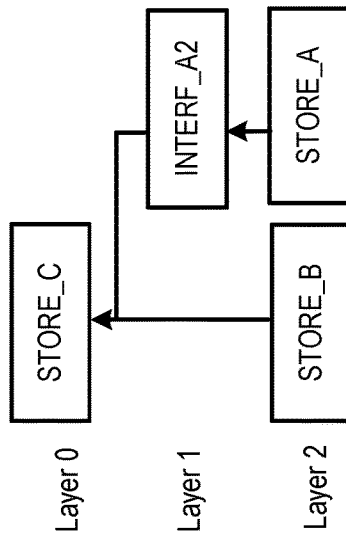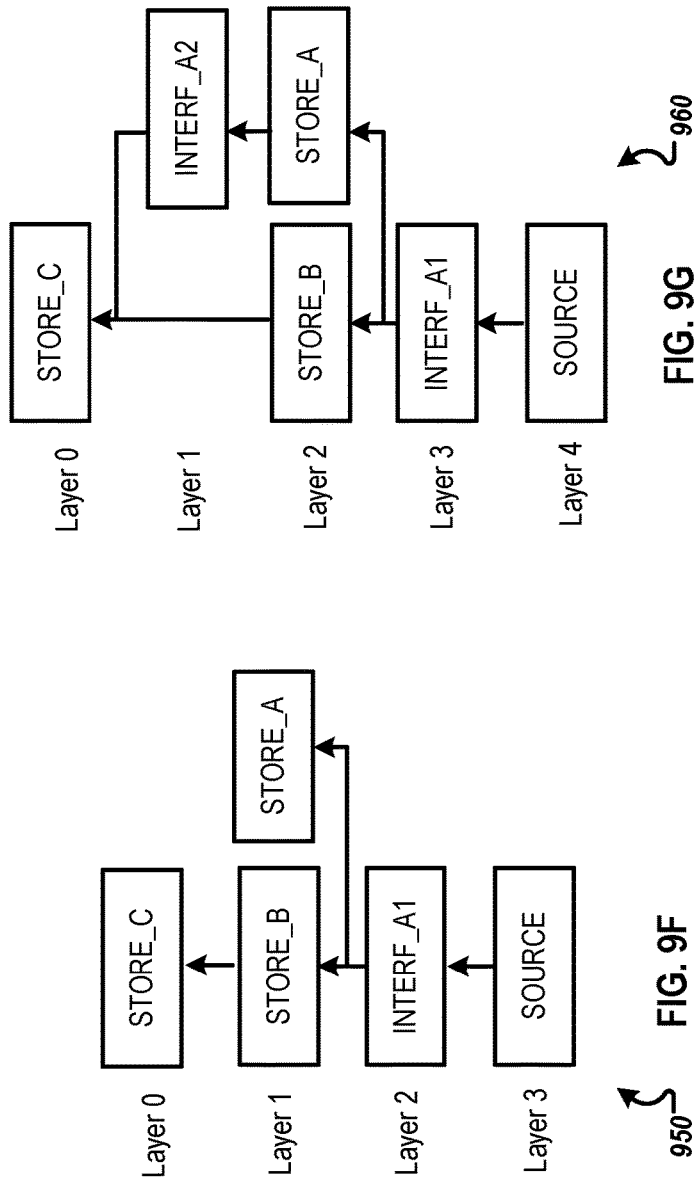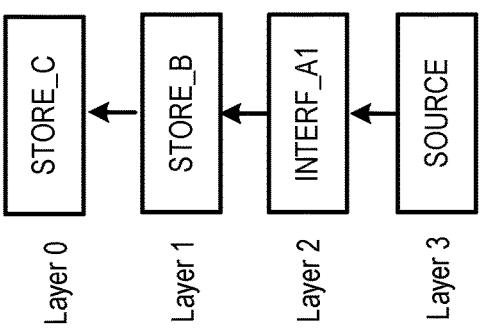

WEIGHTED NODE LAYERING IN GRAPH DRAWING

BACKGROUND

A graph is a set of vertices connected by edges. A directed graph is a graph that includes edges that have an associated direction. A direction of an edge can be indicated by an arrow, for example. An arrow can connect two related vertices. A direction of an edge can represent relationship roles of the related vertices. A directed acyclic graph is a finite directed graph with no directed cycles. A directed acyclic graph includes a finite number of vertices and edges, with each edge directed from one vertex to another, such that there is no way to start at any given vertex and follow a consistently-directed sequence of edges that eventually loops back to the given vertex.

SUMMARY

The present disclosure describes methods and systems, including computer-implemented methods, computer program products, and computer systems for assigning nodes to layers of a graph.

In an implementation, node information for a set of nodes to display on a graph is identified. The node information includes metadata and relationship information. The relationship information indicates, for each relationship, a source node and a target node for the relationship. Weights for the nodes are determined based on the metadata associated with the nodes. The nodes are sorted based on the determined weights. A first node with a highest weight is assigned to a first layer of the graph. For each given node other than the first node: relationships of the given node to assigned nodes are determined, an assigned layer is determined for the given node based on the determined weights and the relationships of the given node to assigned nodes, and the given node is assigned to the assigned layer.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the automatic layout of a graph can be improved by considering the context of the graph. Second, nodes can be positioned next to nodes of a same or a related type, which can improve visual understanding of the graph for users and result in a more natural graph layout. Third, an automated layout result can be equal or similar to a manual layout result done by a user who considers context of the graph. Fourth, a layout of a graph can be automatically generated, saving time as compared to a manual layout process, especially for large graphs. Fifth, nodes can be automatically placed on a graph in a layer that makes the most sense according to the type and purpose of the node. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 8 is an outline of processing results, according to an implementation.

FIGS. 9A-9C and 9E-9G are example graphs in progress, according to an implementation.

FIG. 9D is an example weight list, according to an implementation.

Like reference numbers and designations in the various drawings indicate like elements.

DETAILED DESCRIPTION

The following detailed description describes weighted node layering in a Sugiyama graph drawing method and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

A model can be used to illustrate graphical representations of objects and their relationships. For example, a class diagram is a type of model that can illustrate software classes and associations between the software classes. As another example, an entity relationship diagram is a type of model that can illustrate database entities and relationships between the entities. As yet another example, a data flow diagram can illustrate how data flows between a set of objects. Objects can be represented on a model as shapes, such as a square, rectangle, circle, or other type of shape. A shape on a model can be referred to as a node. A relationship between two nodes can be represented as a line that connects the two nodes. A model can be a directed graph, in that a connection line can have a direction, and the direction can communicate information about the roles of related nodes in a relationship.

A modeling application can present a model on a client computing device (client device) of a user. The modeling application can, for example, read stored model data and can render a graphical model on the client device in a viewport of the modeling application. The modeling application can be configured to identify, from the stored model data, nodes and connections between the nodes.

The modeling application can be configured to determine, using an automatic layout algorithm, where to position identified nodes and connections. The modeling application can execute the layout algorithm to determine a spatial arrangement of nodes according to a set of rules. The modeling application can implement what is referred to as the Sugiyama graph drawing method to lay out nodes in the modeling application. The Sugiyama method can include cycle removal, node layering, node ordering, and horizontal coordinate assigning. The modeling application can be configured to layer nodes while considering the context of a model, such as node types and weights associated with the node types.

Figure 1:
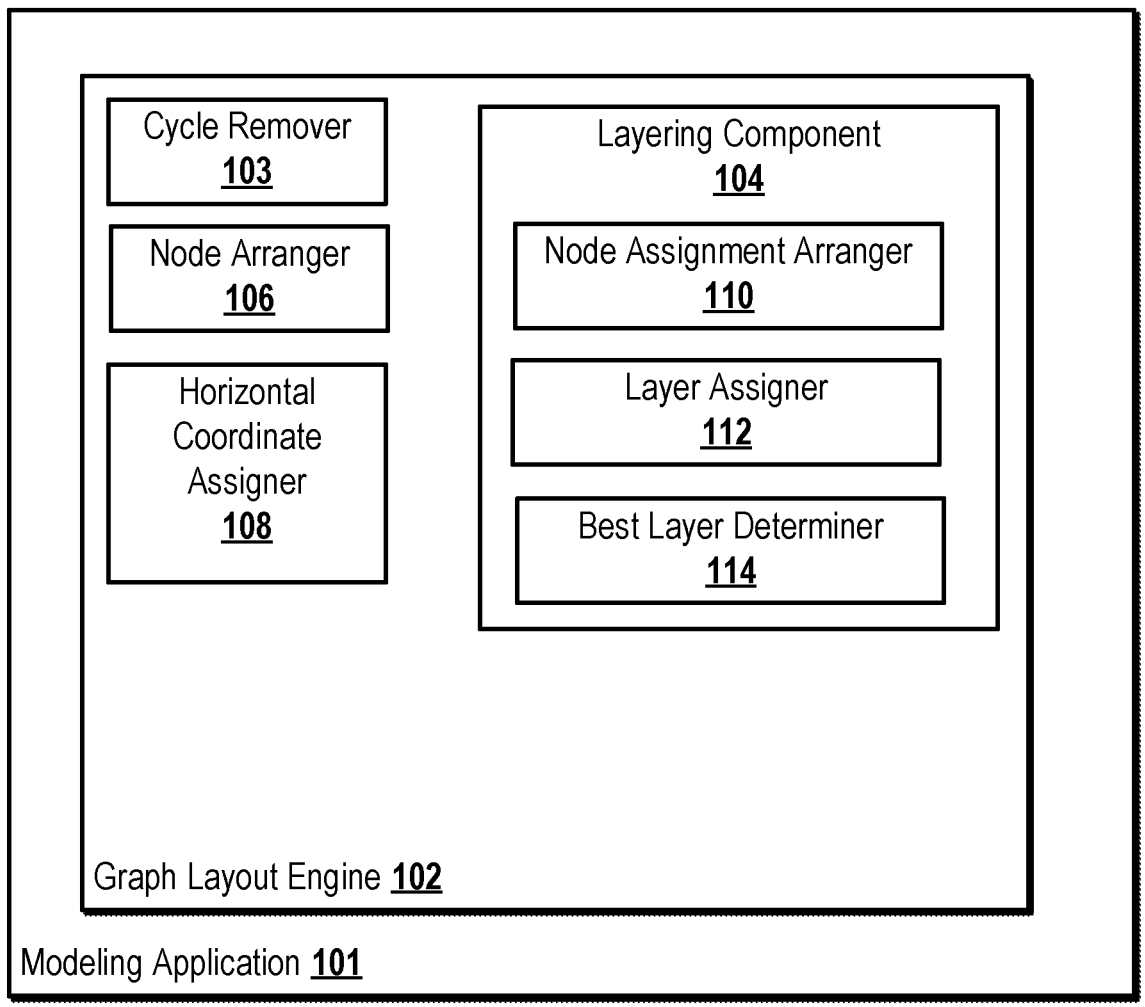
FIG. 1 is a block diagram illustrating an example modeling editor, according to an implementation.

FIG. 1 is a block diagram illustrating an example modeling editor 100, according to an implementation. The modeling editor 101 can include a graph layout engine 102 that is configured to render and lay out nodes of a model in the modeling editor 101. The graph layout engine 102 can implement the Sugiyama graph drawing method. A cycle remover 103 can implement a first step in the Sugiyama method by converting a model that is a directed graph into a directed acyclic graph.

A layering component 104 can implement a second step in the Sugiyama method by assigning single nodes to layers. A layer describes a vertical position of a node. In some implementations, layers can be ordered from top to bottom, with higher-numbered layers being positioned at the bottom of the graph. In other implementations, lower-numbered layers can be positioned at the bottom of the graph. The layering component 104 is described in more detail below.

A node arranger 106 can implement a third step in the Sugiyama method by ordering the nodes of each layer so as to minimize crossings of connections/edges in the model. A horizontal coordinate assigner 108 can implement a fourth step in the Sugiyama method by minimizing a length of edges by optimizing the amount of space between the nodes of each layer.

The layering component 104 can use various algorithms to assign nodes to layers. The layering component 104 can use an algorithm that considers the context of a graph, such as the current structure of a graph metadata associated with each node. Metadata can include a node's type, for example. Some or all node types can be associated with a weight. Weights and types can be used to determine a position of a node. Nodes having a type with a larger weight can be placed under (or over) nodes having a type with a smaller weight. The layering component 104 can cluster nodes by type and/or weight, to determine layers for a set of nodes.

A node assignment arranger 110 can define an order in which nodes are assigned to layers. The node assignment arranger 110 can invoke a layer assigner 112. The layer assigner 112 can identify a set of layers in which a node may be placed. For some cases, the layer assigner 112 directly assigns a node to a layer. For other cases, the layer assigner 112 invokes a best layer determiner 114 to determine which layer to assign to a node. The best layer determiner 114 can receive a set of candidate layers for a node from the layer assigner 112 and can assign a layer to the node based on the weight associated with the type of the node. The node assignment arranger 110, the layer assigner 112, and the best layer determiner are described in more detail below.

Figure 2:
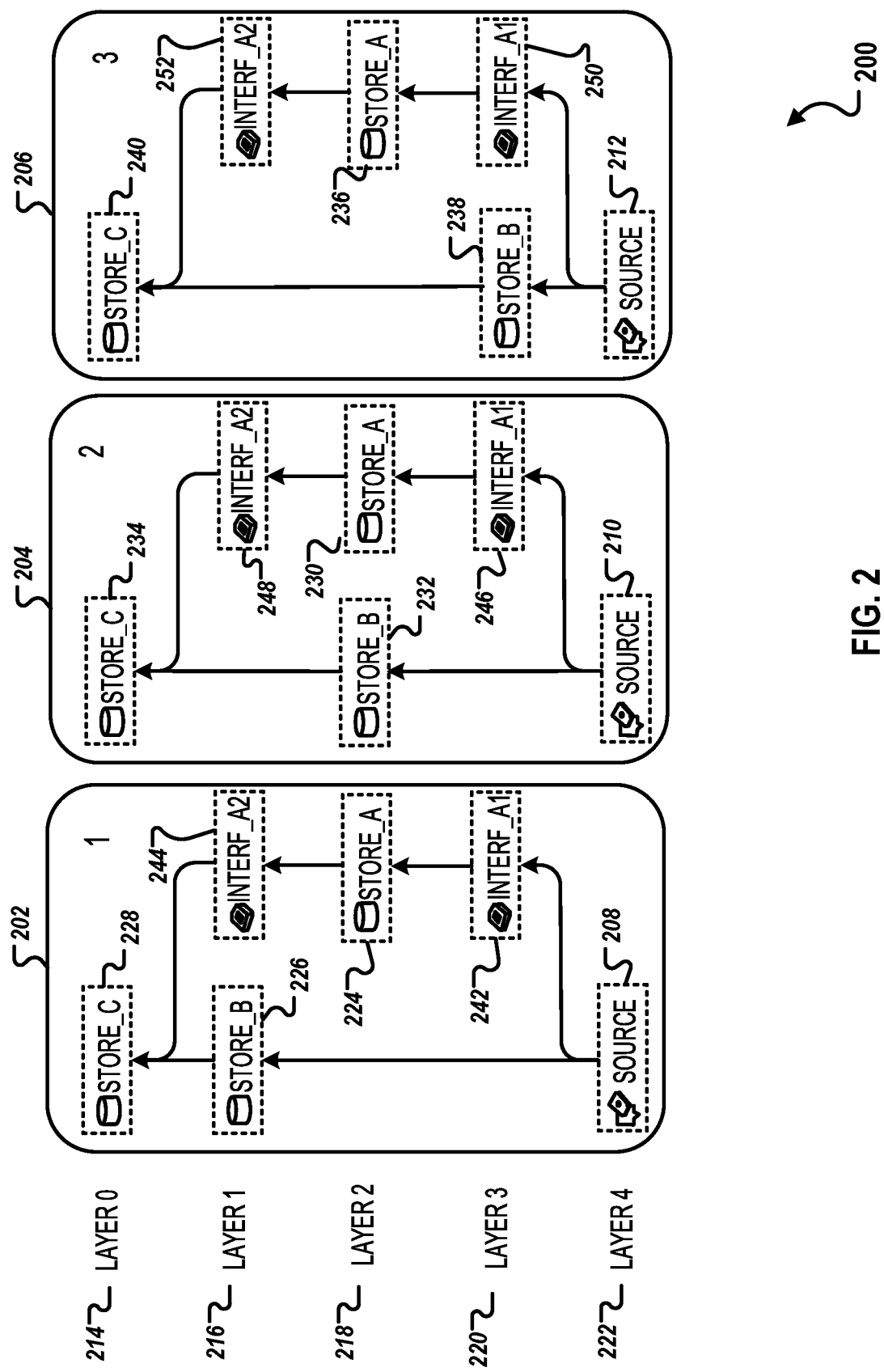
FIG. 2 is a block diagram illustrating example graphs, according to an implementation.

FIG. 2 is a block diagram illustrating example graphs 202, 204, and 206, according to an implementation. The example graphs 202, 204, and 206 are data flows that include nodes that represent various business objects. Directed edges in the example graphs 202, 204, and 206 illustrate how data flows from source to target objects. Each example graph 202, 204, or 206 illustrates a different layout of a same set of business objects.

Business objects can include data source objects 208, 210, and 212. Each data source object 208, 210, and 212 represents an entry point at which data enters a system. Business objects can be placed in one of a set of layers 214 (Layer 0), 216 (Layer 1), 218 (Layer 2), 220 (Layer 3), or 222 (Layer 4). The data source objects 208, 210, and 212 can be placed at a beginning of a respective data flow. The example graphs 202, 204, and 206 can use a lowest layer (Layer 4 222) as a first layer of a respective data flow. In other implementations, a highest layer (Layer 0 214) can be used as a first layer of a respective data flow.

Business objects can include data store objects that represent the storage of data. A rule can specify that data store objects are to appear in a data flow after a data source object. The example graph 202 includes data store objects 224 (STORE_A), 226 (STORE_B), and 228 (STORE_C). The example graph 204 includes data store objects 230 (STORE_A), 232 (STORE_B), and 234 (STORE_C). The example graph 206 includes data store objects 236 (STORE_A), 238 (STORE_B), and 240 (STORE_C).

Business objects can include info source objects that represent interfaces that can be used to encapsulate a certain aspect of a data flow. An info source object can appear in various places on a data flow, so a particular position or layer for an info source object may not be able to be predetermined. Info source objects can include a name that begins with "INTERF" (for "interface"). The example graph 202 includes info source objects 242 (INTERF_A1) and 244 (INTERF_A2). The example graph 204 includes interface objects 246 (INTERF_A1) and 248 (INTERF_A2). The example graph 206 includes interface objects 250 (INTERF_A1) and 252 (INTERF_A2).

Each of the objects on the example graphs 202, 204, and 206 is associated with a type, which is represented by a particular type of icon that corresponds to either a data source, a data store, or an info source object. Each of the objects on the example graphs 202, 204, and 206 has an associated name. Each of the example graphs 202, 204, and 206 illustrate a layout of one data source object named SOURCE, three data store objects named STORE_A, STORE_B, and STORE_C, and two info source objects named INTERF_A1 and INTERF_A2. The SOURCE, INTERF_A1, STORE_A, INTERF_A2, AND STORE_C objects are connected to one another in a sequence of objects, and can be predictably assigned to layers, with the SOURCE objects assigned to the layer 222 (as illustrated by the data source objects 208, 210, and 212 in respective example graphs 202, 204, and 206), and each successive object in the sequence assigned to one layer above the layer assigned to its predecessor object in the sequence. The STORE_B objects are connected to respective SOURCE objects and then to respective STORE_C objects. There are multiple candidate layers for where a respective STORE_B object may be reasonably placed. The STORE_B object can be assigned to the layer 220, as shown by the data store object 238, the layer 218, as shown by the data store object 232, or the layer 216, as shown by the data store object 226.

If layer assignment for nodes is based on type clustering, a modeling editor may, as part of an auto layout algorithm, assign the STORE_B object to the layer 218, as shown by the data store object 232 in the example graph 204, since the layer 218 of the example graph 204 includes the data store object 230 that has the same data store type as the data store object 232. The data store objects 226 and 238 are placed in layers that include objects of types other than a data store object, so the modeling application may not select the layouts shown in the example graphs 202 and 206 and may instead choose the layout shown in the example graph 204.

Figure 3:
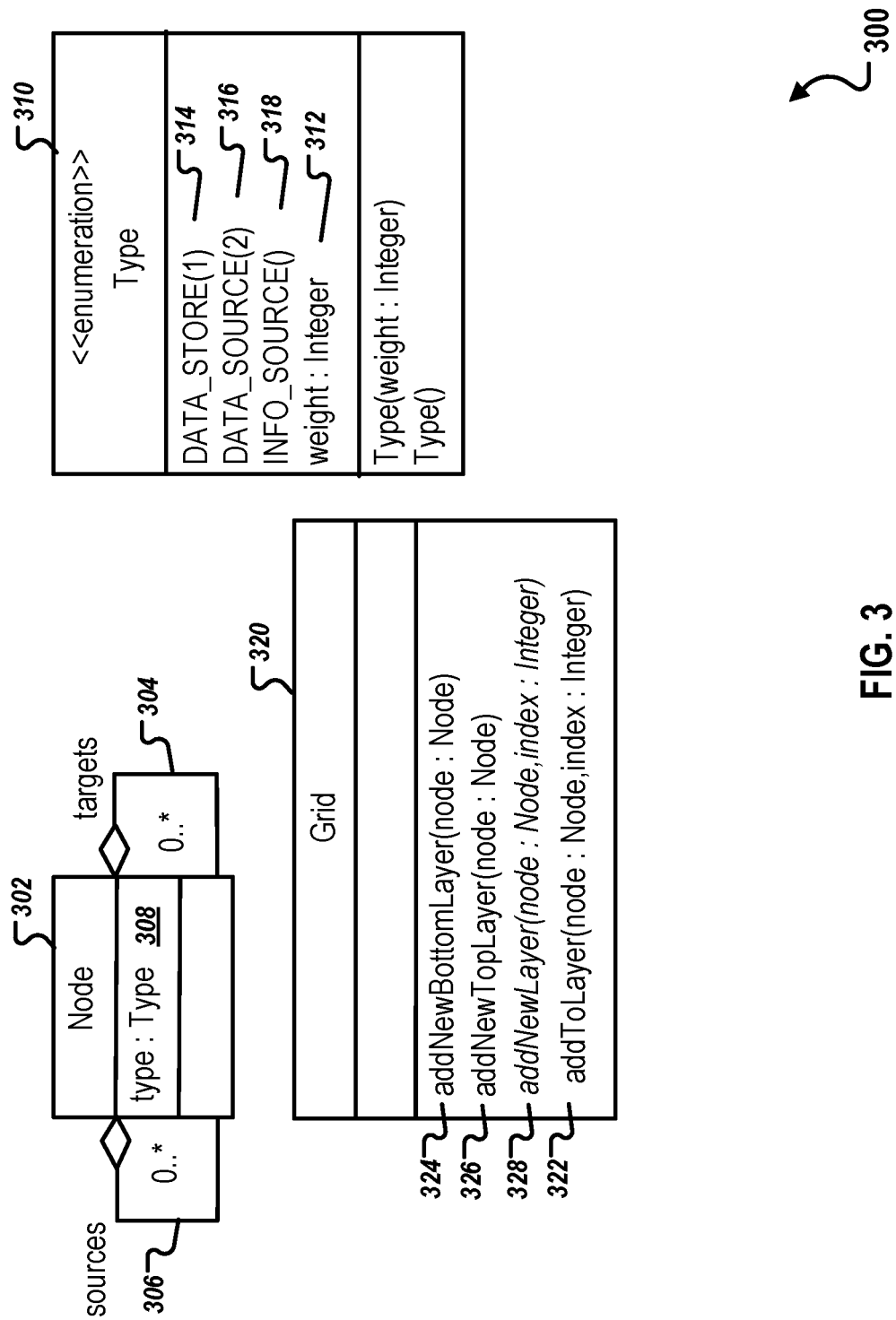
FIG. 3 is a class diagram illustrating an example data model, according to an implementation.

FIG. 3 is a class diagram illustrating an example data model 300, according to an implementation. A Node class 302 can represent a directed graph. An instance of the Node class 302 can have multiple outgoing connections to other nodes, which can be referred to as targets. A targets relationship line 304 indicates that a given Node instance can be associated with zero or more other target Node instances. An instance of the Node class can have multiple incoming connections from other nodes, which can be referred to as sources. A sources relationship line 306 indicates that a given Node instance can be associated with zero or more other source Node instances.

A Node instance has a type attribute 308 that is a literal of a Type enumeration 310. A Type enumeration can have a weight 312, but a weight is not required. Pre-defined Type enumerations include a DATA_STORE type 314 with a weight of one, a DATA_SOURCE type 316 with a weight of two, and an INFO_SOURCE type 318 with no defined weight.

A Grid class 320 can provide functionality for assigning Node instances to layers in a graph. The Grid class 320 can be configured so that a Node instance is assigned to one and only one layer. The Grid class 320 includes an addToLayer method 322 which can be used to add a Node instance to an existing layer. The Grid class 320 includes addNewBottom-Layer 324, addNewTopLayer 326, and addNewLayer 328 methods which can be used to add a Node instance to a new layer at a particular position in the graph. The Grid class 320 can include other methods, such as methods to retrieve Node information from a graph. The data model 300 can be used by layering processes that are defined in more detail below with respect to FIGS. 4-6.

Figure 4:
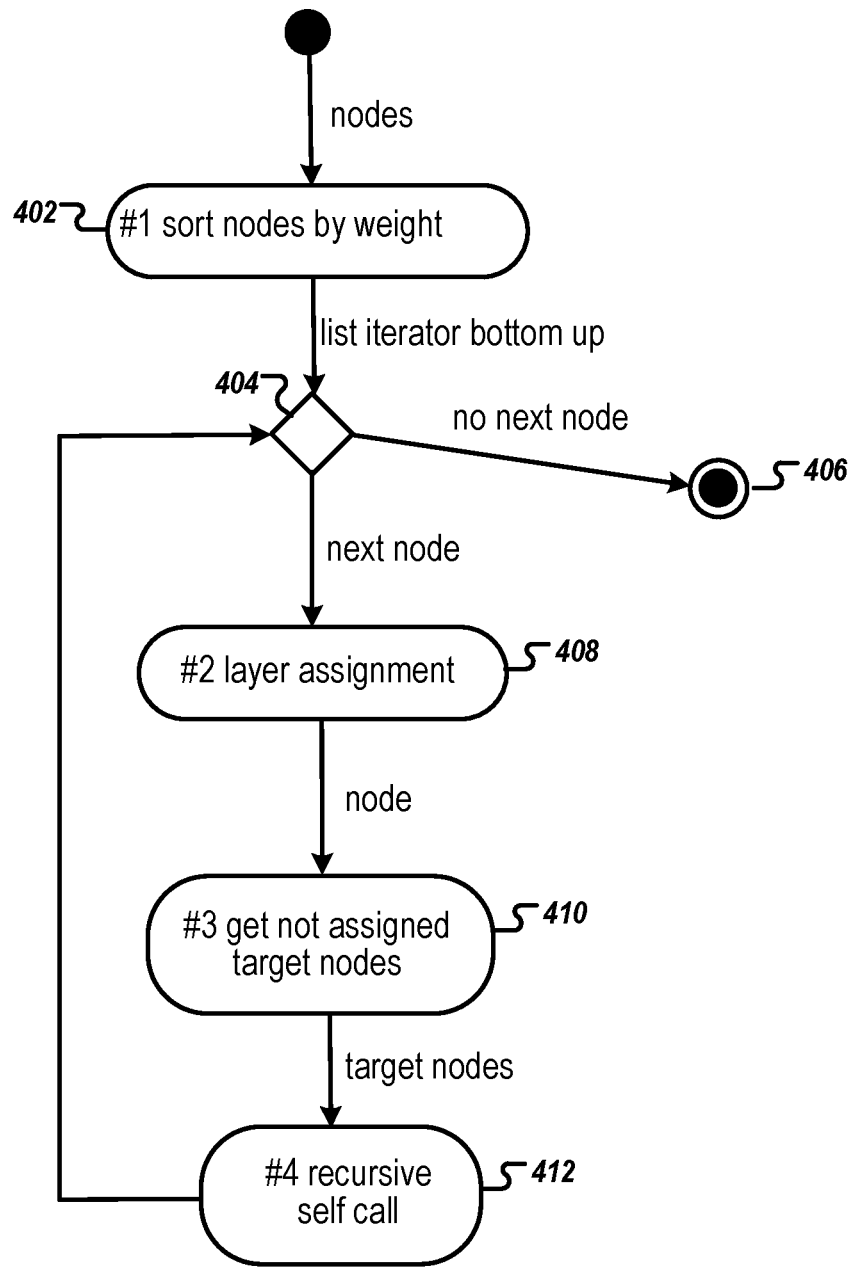
FIG. 4 is a flowchart of an example method for node order assignment, according to an implementation.

FIG. 4 is a flowchart of an example method 400 for node order assignment, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order. Method 400 can be performed by the node assignment arranger 110 described above with respect to FIG. 1.

At 402, nodes are sorted by weight into a sorted list of nodes. Nodes with larger weights can be placed in the sorted list ahead of nodes with smaller weights. Nodes without associated weights can be placed at the end of the sorted list. Sorting the nodes by weight can begin to approximate relative positions of nodes with respect to layer assignment. Nodes with larger weights that appear closer to the beginning of the sorted list can appear at the bottom layers of the graph and nodes with smaller weights that appear farther to the end of the sorted list can appear at higher layers of the graph.

Different factors can affect which layers are assigned to nodes without weights. Ordering weighted nodes by weight and placing unweighted nodes at the end of the sorted list can assist in subsequent processing, with the sorted, weighted nodes providing a base which can be used for determining layer assignment for unweighted nodes. Equally-weighted nodes can be ordered in the sorted list according to average weight of target nodes, or average weight of source nodes if the equally-weighted nodes do not have target nodes. The sorted list of nodes can be useful for other computations, such as considering average weights of targets of nodes that have an equal weight, and considering average source weight of nodes that have equal weight and equal target-node weight, as described below. From 402, method 400 proceeds to 404.

At 404, an iteration construct is executed that includes processing each node of the sorted list, including determining whether a next, unprocessed node exists. If there are no more unprocessed nodes, method 400 proceeds to 406. From 406, method 400 stops.

If there is another unprocessed/next node, method 400 proceeds to 408. At 408, the next node is assigned to a layer. Assigning of nodes to layers is described in more detail below with respect to FIG. 5. From 408, method 400 proceeds to 410.

At 410, target nodes of the assigned node that have not yet been assigned are identified. From 410, method 400 proceeds to 412.

At 412, a recursive call is executed, to perform steps 408 and 410 for each of the unassigned target nodes identified in 410. An effect of the recursive processing is that a graph's path is finalized upwards as target nodes, and then target nodes of a target, etc., are processed. Recursive processing can end when all target nodes of a node are assigned. A result of recursive processing is that a given node may be passed to a layer assignment process more than once, as described in more detail below. When the recursion unwinds, a next node of the sorted list is identified, at 404.

Figure 5:
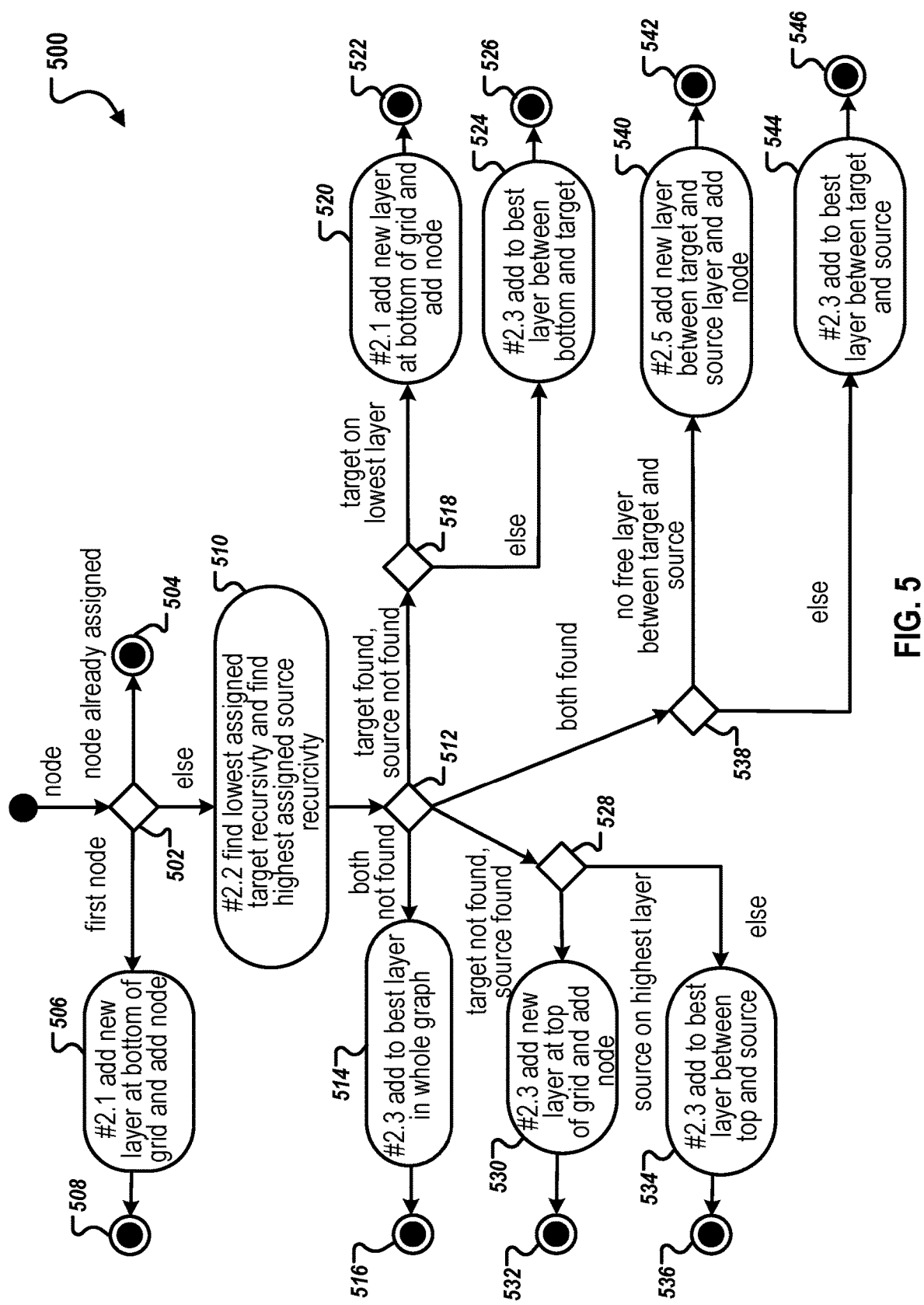
FIG. 5 is a flowchart of an example method for layer assignment, according to an implementation.

FIG. 5 is a flowchart of an example method 500 for layer assignment, according to an implementation. For clarity of presentation, the description that follows generally describes method 500 in the context of the other figures in this description. However, it will be understood that method 500 may be performed, for example, by any suitable system, environment, software, and hardware, or a combination of systems, environments, software, and hardware as appropriate. In some implementations, various steps of method 500 can be run in parallel, in combination, in loops, or in any order.

Method 500 can be performed by the layer assigner 112 described above with respect to FIG. 1. Method 500 can be invoked with a particular node as an input. For some situations, method 500 can include the direct assigning of the node to a particular layer. For other situations, method 500 can include the invocation of method 600 described below with respect to FIG. 6 to select a best node among a candidate set of nodes.

At 502, a determination is made as to whether the node is assigned or is the first node in the sorted list. If the node is assigned, method 500 proceeds to 504. From 504, method 500 stops. If the node is the first node in the sorted list, method 500 proceeds to 506. At 506, a new layer is added to the bottom of the graph and the node is assigned to the new layer. The graph may be referred to as a grid. From 506, method 500 proceeds to 508. From 508, method 500 stops.

If the node is not assigned and is not the first node in the sorted list, method 500 proceeds to 510. At 510, layer assignments are searched to identify an assigned target of the node having a lowest layer and an assigned source of the node having a highest layer. Processing can be performed recursively, to search a target's targets and a source's sources, etc. Identifying an assigned target having a lowest layer and an assigned source having a highest layer can define an upper and lower boundary of layers as candidate layers for assignment for the node. An assigned target of the node and an assigned source of the node may or may not exist in the current layer assignments. From 510, method 500 proceeds to 512.

At 512, a determination is made as to which of four possible outcomes of 510 have occurred, with respect to whether an assigned target of the node and/or an assigned source of the node have been found. If neither an assigned target of the node nor an assigned source of the node have been found, method 500 proceeds to 514.

At 514, the node is added to a best layer that is determined by performing a best layer determination process using an input representing the entire graph. The best layer determination process is described in more detail below with respect to FIG. 6. From 514, method 500 proceeds to 516. From 516, method 500 ends.

If, at 512, an assigned target of the node has been found but an assigned source of the node has not been found, method 500 proceeds to 518. At 518, a determination is made as to whether the located target is assigned to a lowest layer. If the located target is assigned to a lowest layer, method 500 proceeds to 520. At 520, a new layer is added to the bottom of the graph and the node is assigned to the new layer. From 520, method 500 proceeds to 522. From 522, method 500 stops.

If, at 518, the located target is not assigned to a lowest layer, method 500 proceeds to 524. At 524, the node is added to a best layer that is determined by performing the best layer determination process using an input range of the bottom layer to the layer of the located target. From 524, method 500 proceeds to 526. From 526, method 500 ends.

If, at 512, an assigned source of the node has been found but an assigned target of the node has not been found, method 500 proceeds to 528. At 528, a determination is made as to whether the located source is at the highest layer in the graph. If the located source is at the highest layer of the graph, method 500 proceeds to 530.

At 530, a new layer is added to the top of the graph and the node is added to the new layer. From 530, method 500 proceeds to 532. From 532, method 500 ends.

If, at 528, the located source is not at the highest layer of the graph, method 500 proceeds to 534. At 534, the node is added to a best layer that is determined by performing the best layer determination process using an input range of the source layer to the top layer of the graph. From 534, method 500 proceeds to 536. From 536, method 500 ends.

If, at 512, both an assigned source and an assigned target of the node have been found, method 500 proceeds to 538. At 538, a determination is made as to whether there is a free layer between the target and the source. If there is a free layer between the target and the source, method 500 proceeds to 540.

At 540, a new layer is added between the layers of the target and the source and the node is added to the new layer. From 540, method 500 proceeds to 542. From 542, method 500 ends.

If, at 538, there is not a free layer between the target and the source, method 500 proceeds to 544. At 544, the node is added to a best layer that is determined by performing the best layer determination process using an input range of the source layer to the target layer. From 544, method 500 proceeds to 546. From 546, method 500 ends.

Figure 6:
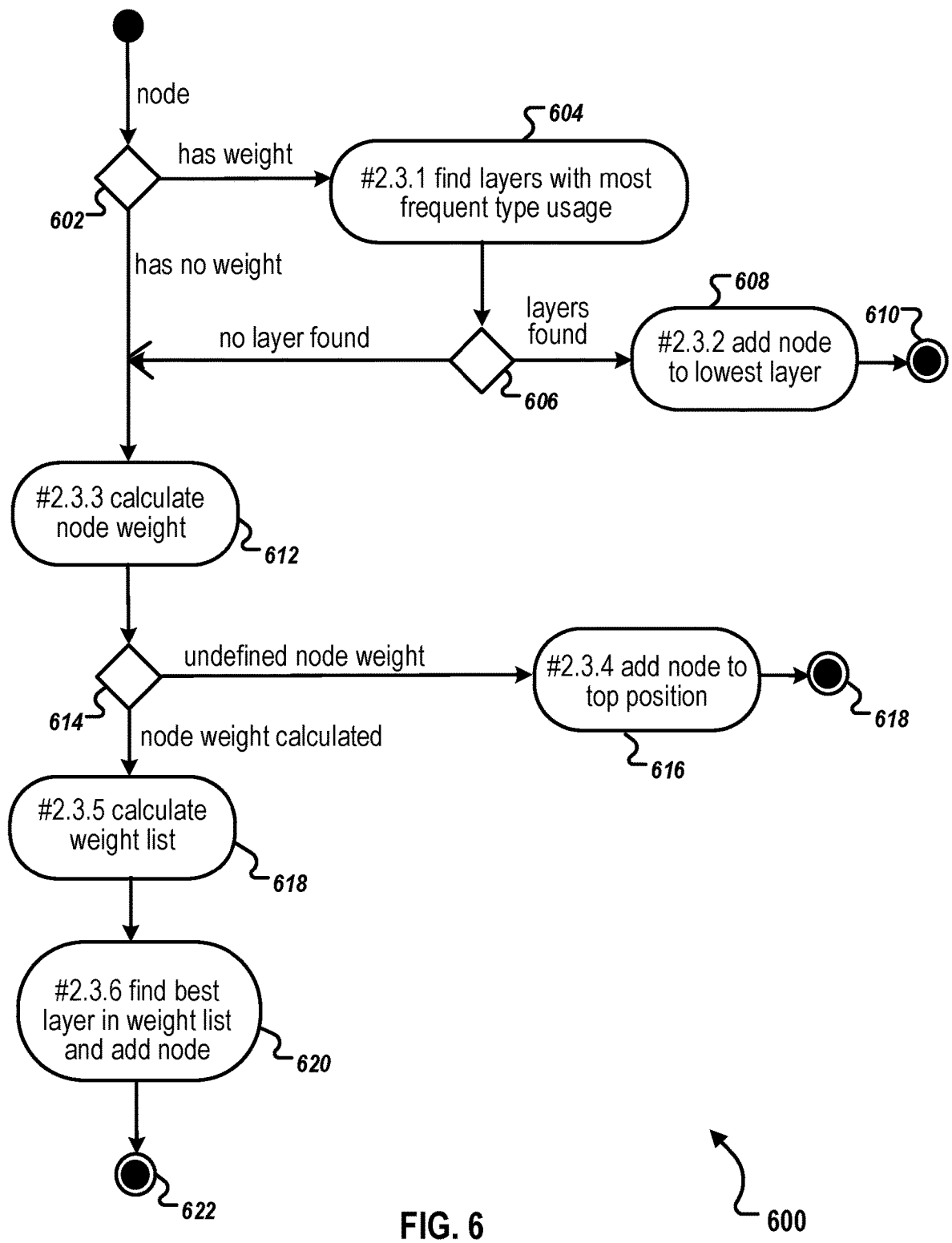
FIG. 6 is a flowchart of an example method for determining a best layer to assign to a node, according to an implementation.

FIG. 6 is a flowchart of an example method 600 for determining a best layer to assign to a node, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware as appropriate. In some implementations, various steps of method 600 can be run in parallel, in combination, in loops, or in any order.

Method 600 can be performed by the best layer determiner 114 described above with respect to FIG. 1. Method 600 can be invoked with inputs of a range of candidate layers and a node to be assigned to a determined best candidate layer based on the weight of the node.

At 602, a determination is made as to whether the node has an associated weight. If the node has an associated weight, method 600 proceeds to 604. At 604, existing layers are analyzed to locate nodes that have a same type as the node. If one or more layers that have a same type are located, one or more layers that have a highest number of nodes with the same type are identified. From 604, method 600 proceeds to 606.

At 606, a determination is made as to whether at least one layer with the same type of the node was identified. If at least one layer with the same type of the node was identified, method 600 proceeds to 608. At 608, the node is assigned to a lowest layer among the one or more identified layers that have the same type as the node. From 608, method 600 proceeds to 610. From 610, method 600 stops.

If, at 606, no layers that have a same type of the node are located, method 600 proceeds to 612. If, at 602, the node does not have an associated weight, method 600 proceeds to 612.

At 612, an attempt is made to calculate a node weight for the node. If the type of the node is associated with a weight, the weight associated with the type is used as the calculated weight for the node. If the type of the node is not associated with a weight, an average weight of all source nodes (if any) of the node is calculated recursively and used as the calculated weight for the node. If the node has no sources, an average weight of all target nodes (if any) of the node is calculated recursively and used as the calculated weight for the node. If the type of the node does not have an associated weight and the node has no sources or targets, a node weight is not calculated for the node in 612. From 612, method 600 proceeds to 614.

At 614, a determination is made as to whether a node weight has been calculated for the node. If a node weight has been not calculated for the node, method 600 proceeds to 616. If a node weight has been calculated for the node, method 600 proceeds to 618.

At 616, the node is assigned to the top layer of the graph. From 616, method 600 proceeds to 618. From 618, method 600 stops.

At 618, a weight list is calculated. A weight list can include an average node weight for each layer of the graph. For each layer, a weight of each node in the layer can be calculated, and an average weight for the layer determined. A weight of an individual node can be calculated as described above at 612. From 618, method 600 proceeds to 620.

At 620, a best layer for the node is determined using the weight list and the calculated weight of the node and the node is added to the determined best layer. The weight list is iterated from bottom to top and the respective list weights are compared to the node weight. If the node weight is equal to a given list weight the node is assigned to the layer associated with the list weight. If a list weight is greater than the node weight a next list weight is identified, and the weight list is further iterated until a list weight that is less than the node weight is identified or iteration stops. If a list weight that is less than the node weight is identified, a new layer is created under the layer associated with the identified list weight and the node is assigned to the new layer. If all list weights are greater than the node weight a new layer is created at the top of the graph and the node is assigned to the new layer. If all list weights are less than the node weight, a new layer is created at the bottom of the graph and the node is assigned to the new layer.

An example weight list is described below with respect to FIG. 7. From 620, method 600 proceeds to 622. From 622, method 600 stops.

Figure 7:
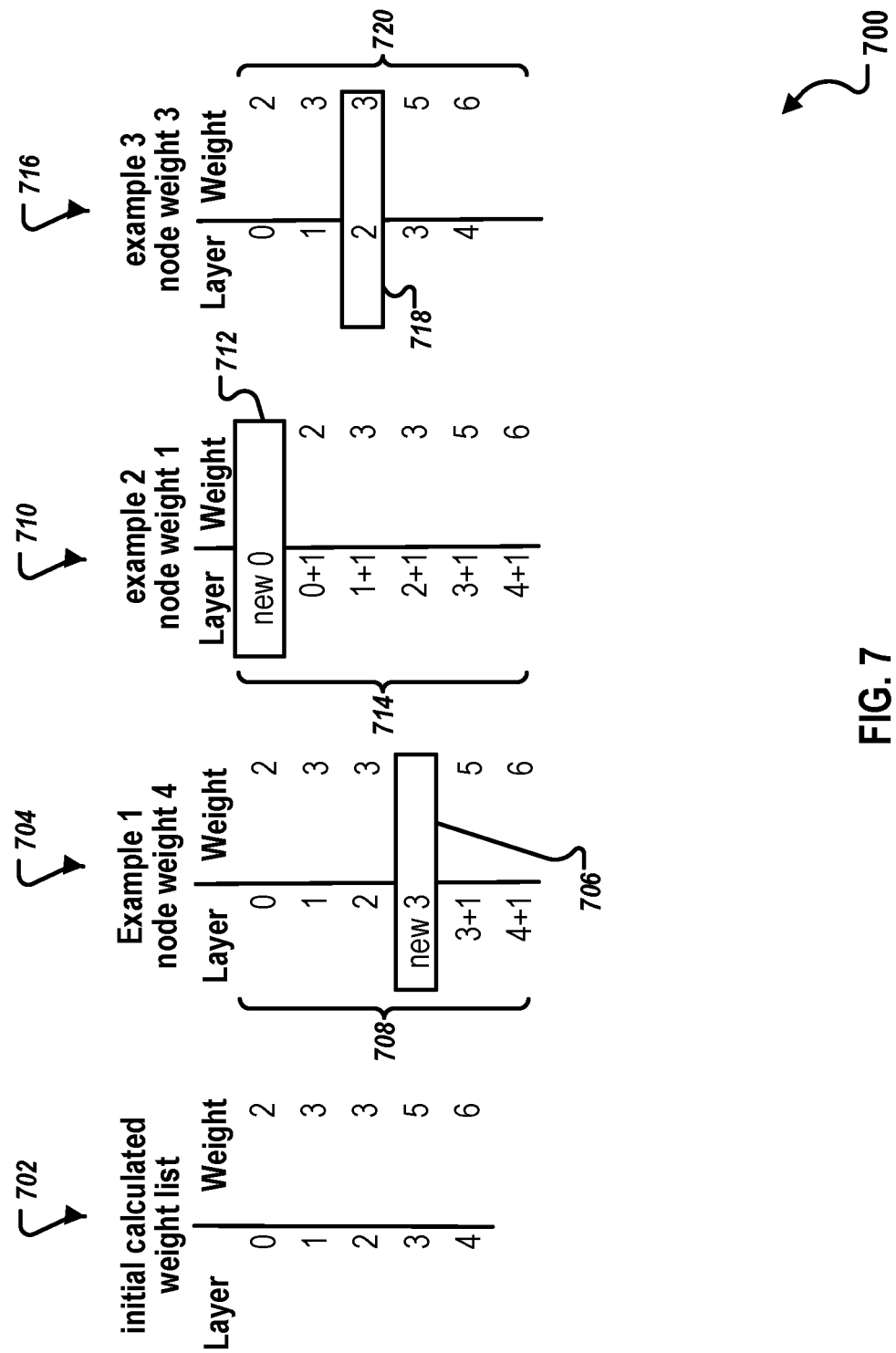
FIG. 7 is a diagram of example weight lists and layer assignments of example nodes, according to an implementation.

FIG. 7 is a diagram 700 of example weight lists and layer assignments of example nodes, according to an implementation. An initial weight list 702 includes example weights of two, three, three, five, and six for layers zero, one, two, three, and four, respectively. In a first example 704, an example node has a weight of four. The node weight of four is less than the weight of five associated with the layer three in the initial weight list 702 and greater than the weight of three associated with the layer two in the initial weight list 702. Accordingly, and as indicated by a new entry 706 in an updated weight list 708, a new layer can be added to the graph between layers two and three (as a new layer three). The node can be assigned to the new layer.

In a second example 710, an example node has a weight of one. The initial weight list 702 is iterated from the bottom to the top in an attempt to identify a layer that has a weight less than or equal to the node weight of one. No list weights are found that are less than or equal to the node weight of one, so a new layer is added to the graph as a topmost layer, as illustrated by a new entry 712 in an updated weight list 714.

In a third example 716, an example node has a weight of three. Bottom to top iteration of the initial weight list 702 can identify a weight list item associated with layer two that has a list weight of three equal to the node weight of three. Accordingly, the node can be added to layer two, as indicated by a highlighted entry 718 in a weight list 720.

FIG. 8 is an outline 800 of processing results, according to an implementation. The outline 800 includes processing results that can be produced when performing the method 400 (and associated methods 500 and 600) using the nodes included in the example graph 204, as if those nodes had not yet been added to the example graph 204. The outline 800 includes processing steps numbered, on the left side of the outline 800, as steps 801 to 831. Relevant method steps from the methods 400, 500, and 600 are shown in parentheses in the outline 800.

For example, at 801, step 402 of method 400 is performed to sort the nodes included in the example graph 204 by weight, based on the type weights defined in the example data model 300. The nodes, sorted by weight, in decreasing weight, are: SOURCE, STORE_A, STORE_B, STORE_C, INTERF_A1, and INTERF_A2.

At 802, step 408 of method 400 is performed to assign a layer to the first node in the sorted list, the SOURCE node, which includes performing the method 500. At 803, step 506 of method 500 is performed to add a new, first layer to the graph and assign the SOURCE node to the new layer, since the SOURCE node is the first node to be assigned to a layer. FIG. 9A shows a graph-in-progress 900 that includes the added layer and node.

At 804, step 410 of method 400 is performed to identify a set of unassigned target nodes of the SOURCE node, the identified set including the STORE_B and INTERF_A1 nodes. Steps 408 to 412 of method 400 are performed recursively for the identified STORE_B and INTERF_A1 nodes. Outline steps 805 to 811, described below, correspond to the recursive call for the STORE_B node. Outline steps 812 to 817, described below, correspond to the recursive call for the INTERF_A1 node.

At 805, step 408 of method 400 is performed for the STORE_B node to assign a layer to the STORE_B node, which includes performing the method 500. At 806, method steps 510 and 512 of method 500 are performed for the STORE_B node, to determine that for STORE_B, an assigned source node of STORE_B was found (the SOURCE node), but no assigned target nodes for STORE_B were found. At 807, steps 528 and 530 of the method 500 are performed to determine that the identified source node of SOURCE is on a highest layer, to add a new layer at the top of the graph, and to add the STORE_B node to the added layer, resulting in a graph-in-progress 910 as shown in FIG. 9B.

At 808, step 410 of method 400 is performed to identify a set of unassigned target nodes of the STORE_B node, the identified set including the STORE_C node. Steps 408 to 412 of method 400 are performed recursively for the identified STORE_C node. Outline steps 809 to 811, described below, correspond to the recursive call for the STORE_C node.

At 809, step 408 of method 400 is performed for the STORE_C node to assign a layer to the STORE_C node, which includes performing the method 500. At 810, method steps 510 and 512 of method 500 are performed for the STORE_B node, to determine that an assigned target of the STORE_C node was not found but an assigned source of the STORE_C node was found (STORE_B). At 811, steps 528 and 530 of the method 500 are performed to determine that the identified assigned source node of STORE_B is on a highest layer, to add a new layer at the top of the graph, and to add the STORE_C node to the added layer, resulting in a graph-in-progress 920 as shown in FIG. 9C.

At 812, step 408 of method 400 is performed for the INTERF_A1 node to assign a layer to the INTERF_A1 node, which includes performing the method 500. At 813, method steps 510 and 512 of method 500 are performed for the INTERF_A1 node, to determine that both an assigned target (STORE_C) and an assigned source (SOURCE) have been found. At 814, step 544 of method 500 is performed to add the INTERF_A1 node to a best determined layer between the SOURCE and STORE_C nodes, which includes performing method 600. At 815, steps 602 and 612 of method 600 are performed to determine that the INTERF_A1 node initially has no associated weight and to calculate a weight for the INTERF_A1 node. As described above, in step 812, since the type of the INTERF_A1 node is not associated with a weight, an average weight of all source nodes of the INTERF_A1 node is calculated recursively and used as the calculated weight for the INTERF_A1 node. Such a calculation results in a calculated weight of two for the INTERF_A1 node.

At 816, step 618 of method 600 is performed to calculate a weight list for candidate layers for the INTERF_A1 node. An example weight list 930 is shown in FIG. 9D. The example weight list 930 includes one layer, since there is one candidate layer, layer 1, between the SOURCE and STORE_C layers in the current graph-in-progress 920. At 817, step 620 of method 600 is performed to find a best layer for the INTERF_A1 node. As described above, when determining a best layer using a weight list, if a list weight that is less than the node weight is identified, a new layer is created under the layer associated with the identified list weight and the node is assigned to the new layer. Accordingly, a new layer for INTERF_A1 is created and positioned under the layer (layer one) for STORE_B, as a new layer two, as shown in a graph-in-progress 940 of FIG. 9E.

At 818, step 408 of method 400 is performed for the STORE_A node to assign a layer to the STORE_A node, which includes performing the method 500. At 819, method steps 510 and 512 of method 500 are performed for the INTERF_A1 node, to determine that both an assigned target (STORE_C) and an assigned source (INTERF_A1) have been found.

At 820, steps 538 and 544 of method 500 are performed to add the STORE_A node to a best determined layer between the INTERF_A1 node and the STORE_C node, which includes performing method 600. At 821, steps 602 and 604 of method 600 are performed to determine that the STORE_A node has a weight and to find layers with a most frequent type usage, including identifying layers zero and one of the graph-in-progress 940 as including nodes having one node of the same type (data store) as the STORE_A node. At 822, steps 606 and 608 of the method 600 are performed to add the STORE_A node to the lowest layer having the most nodes of the same type as STORE_A, which includes adding STORE_A to layer one, as shown in a graph-in-progress 950 of FIG. 9F.

At 823, step 410 of method 400 is performed to identify a set of unassigned target nodes of the STORE_A node, the identified set including the INTERF_A2 node. Steps 408 to 412 of method 400 are performed recursively for the identified INTERF_A2 node. Outline steps 824 to 26, described below, correspond to the recursive call for the INTERF_A2 node.

At 824, step 408 of method 400 is performed for the INTERF_A2 node to assign a layer to the INTERF_A2 node, which includes performing the method 500. At 825, method steps 510 and 512 of method 500 are performed for the INTERF_A2 node, to determine that STORE_C is an assigned target for INTERF_A2 and STORE_A is an assigned source for STORE_A. At 826, steps 538 and 540 of method 500 are performed to determine that there is no free layer between STORE_C and STORE_A, to add a new layer between STORE_C and STORE_A, and to add the INTERF_A2 node to the new layer, as shown in a graph 960 of FIG. 9G.

At 827 to 831, recursion cycles unwind, with respective method 500 executions terminating with step 504 after determining respective nodes have already been placed onto the graph 960.

The layer assignment methods described above with respect to FIGS. 4 to 8 can solve problems that may occur with other automatic layout techniques. For example, some automatic layout techniques may have issues with correctly placing nodes that don't have a defined source. For example, FIG. 10A illustrates an example graph 1000 in which a node 1002 is incorrectly placed, according to an implementation. The node 1002 is of a reporting type, and a correct layer for the node 1002 is a layer associated with another reporting-related node 1004. Some automatic layout algorithms may incorrectly place the node 1002 at a bottom layer of the graph 1000, due to the node 1002 not having a defined source.

Figure 10B:
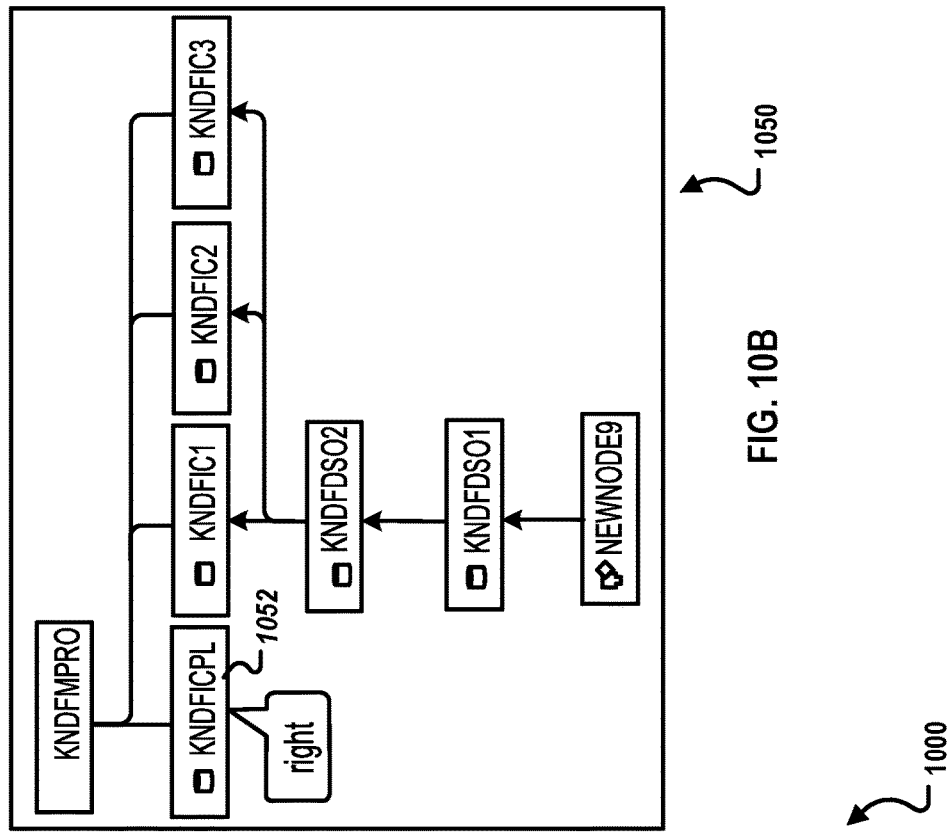
FIG. 10B illustrates an example graph in which a node is correctly placed using an automatic layout algorithm that considers a weight of the node, according to an implementation.
Figure 10A:
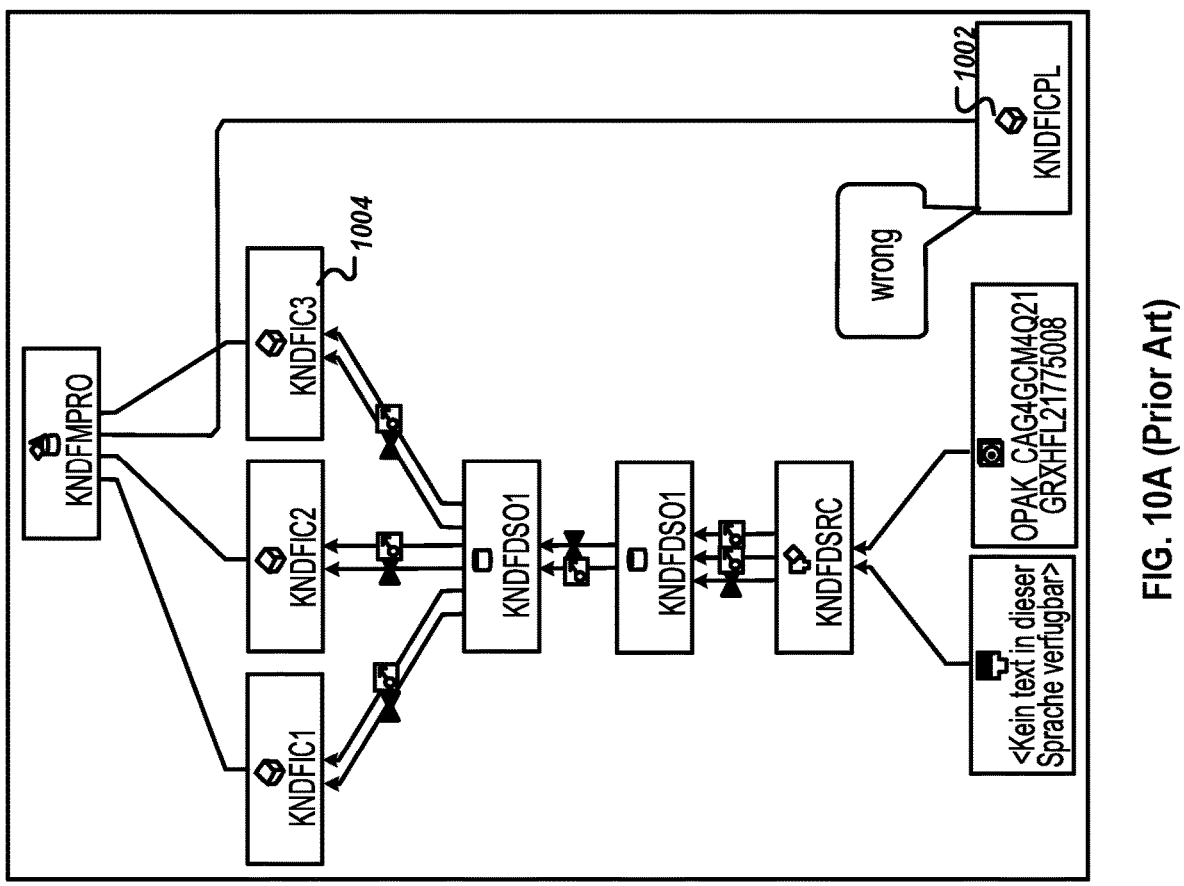
FIG. 10A illustrates an example graph in which a node 1002 is incorrectly placed, according to an implementation.

FIG. 10B illustrates an example graph 1050 in which a node is correctly placed using an automatic layout algorithm that considers a weight of the node, according to an implementation. A node 1052, which corresponds to the node 1002, has a reporting type. The node 1052 is correctly assigned to a second-from-the-top layer along with other nodes having a reporting type, due to the type of the node 1052 being the same as other nodes in the assigned layer, since a same node type may result in a same or similar weight as other same-typed nodes.

Figure 11:
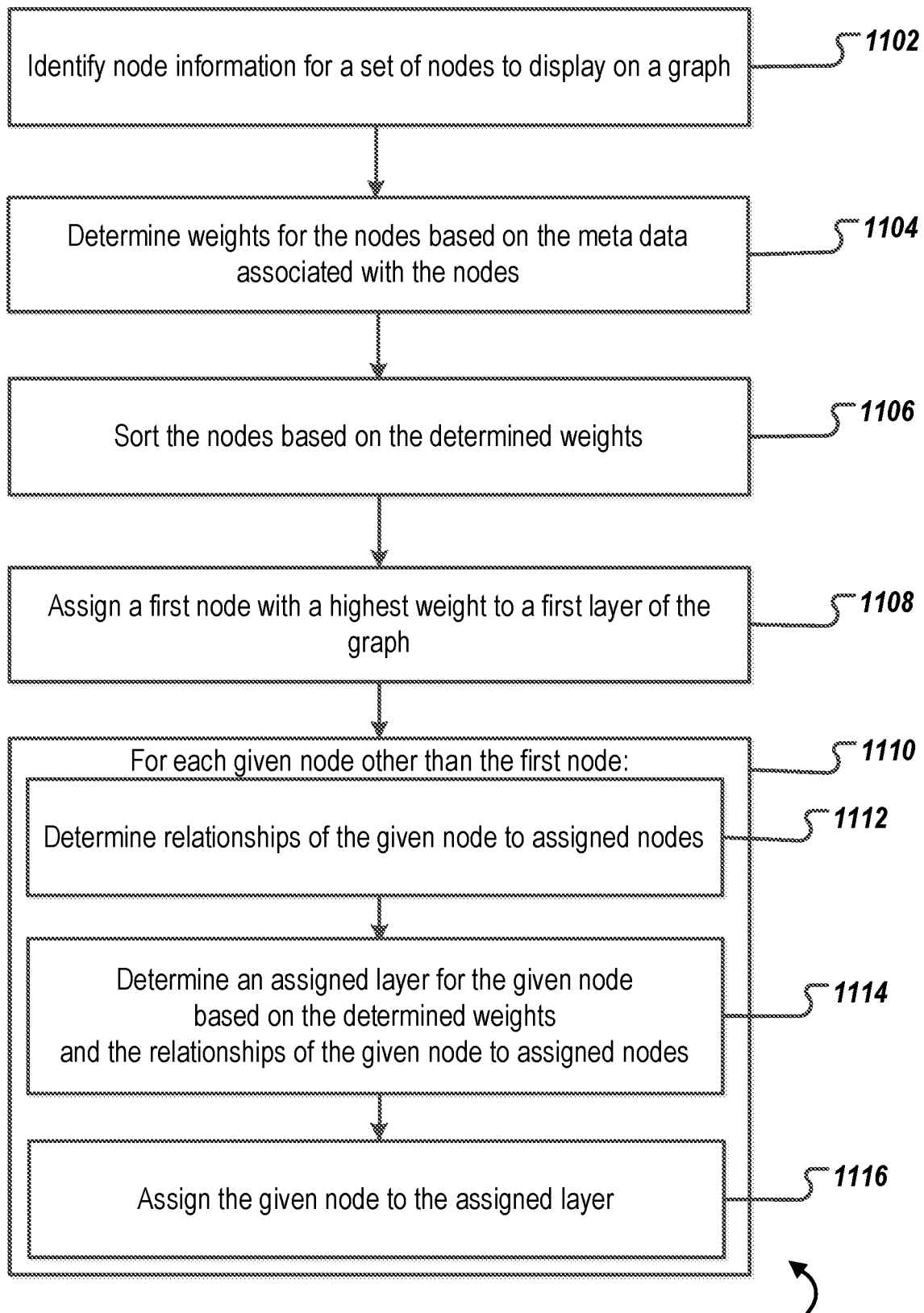
FIG. 11 is a flowchart of an example method for assigning nodes to layers of a graph, according to an implementation.

FIG. 11 is a flowchart of an example method 1100 for assigning nodes to layers of a graph, according to an implementation. For clarity of presentation, the description that follows generally describes method 1100 in the context of the other figures in this description. However, it will be understood that method 1100 may be performed, for example, by any suitable system, environment, software, and hardware, or a combination of systems, environments, software, and hardware as appropriate. In some implementations, various steps of method 1100 can be run in parallel, in combination, in loops, or in any order. The method 1100 can be performed by the layering component 104 described above with respect to FIG. 1.

At 1102, node information is identified for a set of nodes to display on a graph. The node information can include metadata and relationship information. The relationship information can indicate, for each relationship, a source node and a target node for the relationship. The metadata can include a node type. From 1102, method 1100 proceeds to 1104.

At 1104, weights for the nodes are determined based on the metadata associated with the nodes. Node weights can be based at least in part on the type of a node. Some nodes may not have an associated weight. Some types may not be associated with a weight, for example. From 1104, method 1100 proceeds to 1106.

At 1106, the nodes are sorted based on the determined weights. A sorted list of nodes can be determined. Nodes that do not have an associated weight can be placed at the end of the sorted list. From 1106, method 1100 proceeds to 1108.

At 1108, a first node with a highest weight is assigned to a first layer of the graph. From 1108, method 1100 proceeds to 1110.

At 1110, each given node other than the first node is processed at 1112 to 1116.

At 1112, relationships of the given node to assigned nodes are determined. Determining the relationships of the given node to assigned nodes can include: determining whether the given node is a source node of at least one assigned target node that has been assigned to a layer of the graph; and determining whether the given node is a target node of at least one assigned source node that has been assigned to a layer of the graph. From 1112, method 1100 proceeds to 1114.

At 1114, an assigned layer is determined for the given node based on the determined weights and the relationships of the given node to assigned nodes. For some nodes, a set of candidate layers can be determined, as described in more detail below, and the assigned layer can be determined from the set of candidate layers. A determination can be made as to whether a weight can be determined for the given node. If a weight cannot be determined for the given node, the assigned layer can be the top layer of the graph. If a weight can be determined for the given node, a weight list can be determined that includes a list weight for each candidate layer and the assigned layer can be determined based on the determined weight of the given node and the weight list.

Determining the assigned layer can include determining that the given node is a source node to at least one assigned target node and a target node to at least one assigned source node. If there is a free layer between the lowest assigned target node and the highest assigned source node, the candidate layers can be layers of the graph between the lowest assigned target node and the highest assigned source node and the assigned node can be determined from the candidate layers. If there is not a free layer between the lowest assigned target node and the highest assigned source node, a new layer can be added between the lowest assigned target node and the highest assigned source node and the assigned layer can be the new layer.

Determining the assigned layer can include determining that the given node is a source node to at least one assigned target node and is not a target node to an assigned source node. If the lowest assigned target node is on a lowest layer of the graph, a new layer can be added at the bottom of the graph and the assigned layer can be the new layer. If the lowest assigned target node is not on a lowest layer of the graph, candidate layers can be layers of the graph between the lowest layer of the graph and the lowest assigned target node and the assigned node can be determined from the candidate layers.

Determining the assigned node can include determining that the given node is not a source node to an assigned target node and is a target node to at least one assigned source node. If the highest assigned source node is on a highest layer of the graph, a new layer can be added to the top of the graph and the assigned layer can be the new layer. If the highest assigned source node is not on a highest layer of the graph, candidate layers can be layers of the graph between the highest layer of the graph and the highest assigned source node and the assigned node can be determined from the candidate layers.

From 1114, method 1100 proceeds to 1116. At 1116, the given node is assigned to the assigned layer. If the graph is being rendered, the given node can be rendered in the assigned layer. From 1116, method 1100 stops.

Figure 12:
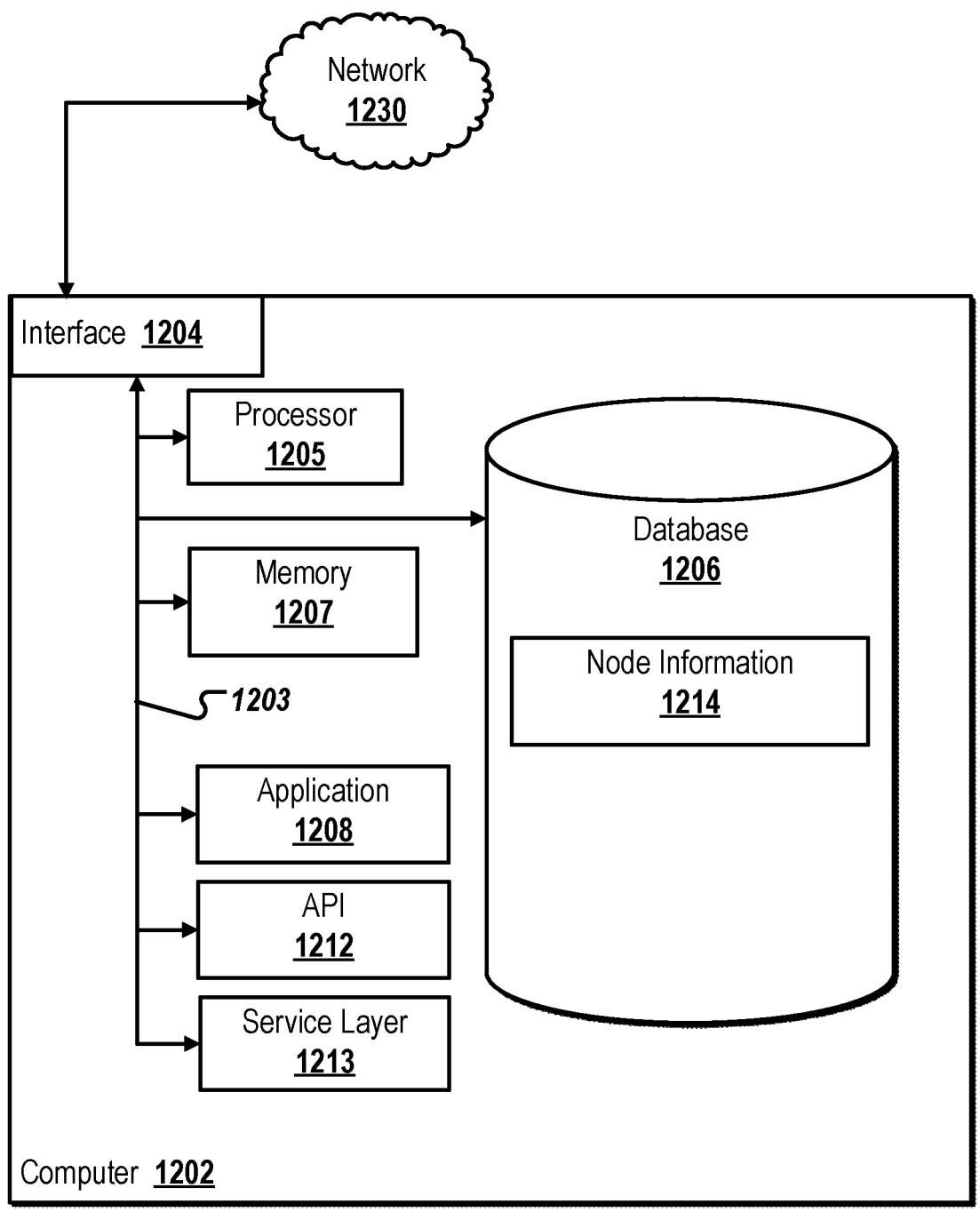
FIG. 12 is a block diagram illustrating an exemplary computer system used to provide computational functionalities associated with described algorithms, methods, functions, processes, flows, and procedures as described in the instant disclosure, according to an implementation.

FIG. 12 is a block diagram of an exemplary computer system 1200 used to provide computational functionalities associated with described algorithms, methods, functions, processes, flows, and procedures as described in the instant disclosure, according to an implementation. The illustrated computer 1202 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1202 may comprise a computer that includes an input device, such as a keypad, keyboard, touch screen, or other device that can accept user information, and an output device that conveys information associated with the operation of the computer 1202, including digital data, visual, or audio information (or a combination of information), or a graphical user interface (GUI).

The computer 1202 can serve in a role as a client, network component, a server, a database or other persistency, or any other component (or a combination of roles) of a computer system for performing the subject matter described in the instant disclosure. The illustrated computer 1202 is communicably coupled with a network 1230. In some implementations, one or more components of the computer 1202 may be configured to operate within environments, including cloud-computing-based, local, global, or other environment (or a combination of environments).

At a high level, the computer 1202 is an electronic computing device operable to receive, transmit, process, store, or manage data and information associated with the described subject matter. According to some implementations, the computer 1202 may also include or be communicably coupled with an application server, e-mail server, web server, caching server, streaming data server, or other server (or a combination of servers).

The computer 1202 can receive requests over network 1230 from a client application (for example, executing on another computer 1202) and responding to the received requests by processing the said requests in an appropriate software application. In addition, requests may also be sent to the computer 1202 from internal users (for example, from a command console or by other appropriate access method), external or third-parties, other automated applications, as well as any other appropriate entities, individuals, systems, or computers.

Each of the components of the computer 1202 can communicate using a system bus 1203. In some implementations, any or all of the components of the computer 1202, both hardware or software (or a combination of hardware and software), may interface with each other or the interface 1204 (or a combination of both) over the system bus 1203 using an application programming interface (API) 1212 or a service layer 1213 (or a combination of the API 1212 and service layer 1213). The API 1212 may include specifications for routines, data structures, and object classes. The API 1212 may be either computer-language independent or dependent and refer to a complete interface, a single function, or even a set of APIs. The service layer 1213 provides software services to the computer 1202 or other components (whether or not illustrated) that are communicably coupled to the computer 1202. The functionality of the computer 1202 may be accessible for all service consumers using this service layer. Software services, such as those provided by the service layer 1213, provide reusable, defined functionalities through a defined interface. For example, the interface may be software written in JAVA, C++, or other suitable language providing data in extensible markup language (XML) format or other suitable format. While illustrated as an integrated component of the computer 1202, alternative implementations may illustrate the API 1212 or the service layer 1213 as stand-alone components in relation to other components of the computer 1202 or other components (whether or not illustrated) that are communicably coupled to the computer 1202. Moreover, any or all parts of the API 1212 or the service layer 1213 may be implemented as child or sub-modules of another software module, enterprise application, or hardware module without departing from the scope of this disclosure.

The computer 1202 includes an interface 1204. Although illustrated as a single interface 1204 in FIG. 12, two or more interfaces 1204 may be used according to particular needs, desires, or particular implementations of the computer 1202.

The interface 1204 is used by the computer 1202 for communicating with other systems in a distributed environment that are connected to the network 1230 (whether illustrated or not). Generally, the interface 1204 comprises logic encoded in software or hardware (or a combination of software and hardware) and operable to communicate with the network 1230. More specifically, the interface 1204 may comprise software supporting one or more communication protocols associated with communications such that the network 1230 or interface's hardware is operable to communicate physical signals within and outside of the illustrated computer 1202.

The computer 1202 includes a processor 1205. Although illustrated as a single processor 1205 in FIG. 12, two or more processors may be used according to particular needs, desires, or particular implementations of the computer 1202. Generally, the processor 1205 executes instructions and manipulates data to perform the operations of the computer 1202 and any algorithms, methods, functions, processes, flows, and procedures as described in the instant disclosure.

The computer 1202 also includes a database 1206 that can hold data for the computer 1202 or other components (or a combination of both) that can be connected to the network 1230 (whether illustrated or not). For example, database 1206 can be an in-memory, conventional, or other type of database storing data consistent with this disclosure. In some implementations, database 1206 can be a combination of two or more different database types (for example, a hybrid in-memory and conventional database) according to particular needs, desires, or particular implementations of the computer 1202 and the described functionality. Although illustrated as a single database 1206 in FIG. 12, two or more databases (of the same or combination of types) can be used according to particular needs, desires, or particular implementations of the computer 1202 and the described functionality. While database 1206 is illustrated as an integral component of the computer 1202, in alternative implementations, database 1206 can be external to the computer 1202. The database 1206 can include node information 1214. The node information 1214 can be for a set of nodes that can be displayed on a graph, including metadata and node relationship information. The node relationship information can indicate, for each relationship, a source node and a target node for the relationship. The metadata can include node type information.

The computer 1202 also includes a memory 1207 that can hold data for the computer 1202 or other components (or a combination of both) that can be connected to the network 1230 (whether illustrated or not). For example, memory 1207 can be random access memory (RAM), read-only memory (ROM), optical, magnetic, and the like storing data consistent with this disclosure. In some implementations, memory 1207 can be a combination of two or more different types of memory (for example, a combination of RAM and magnetic storage) according to particular needs, desires, or particular implementations of the computer 1202 and the described functionality. Although illustrated as a single memory 1207 in FIG. 12, two or more memories 1207 (of the same or combination of types) can be used according to particular needs, desires, or particular implementations of the computer 1202 and the described functionality. While memory 1207 is illustrated as an integral component of the computer 1202, in alternative implementations, memory 1207 can be external to the computer 1202.

The application 1208 is an algorithmic software engine providing functionality according to particular needs, desires, or particular implementations of the computer 1202, particularly with respect to functionality described in this disclosure. For example, application 1208 can serve as one or more components, modules, applications, etc. Further, although illustrated as a single application 1208, the application 1208 may be implemented as multiple applications 1207 on the computer 1202. In addition, although illustrated as integral to the computer 1202, in alternative implementations, the application 1208 can be external to the computer 1202.

There may be any number of computers 1202 associated with, or external to, a computer system containing computer 1202, each computer 1202 communicating over network 1230. Further, the term "client," "user," and other appropriate terminology may be used interchangeably as appropriate without departing from the scope of this disclosure. Moreover, this disclosure contemplates that many users may use one computer 1202, or that one user may use multiple computers 1202.

Described implementations of the subject matter can include one or more features, alone or in combination.

For example, in a first implementation, a computer-implemented method comprises: identifying node information for a set of nodes to display on a graph, the node information including metadata and relationship information, the relationship information indicating, for each relationship, a source node and a target node for the relationship; determining weights for the nodes based on the metadata associated with the nodes; sorting the nodes based on the determined weights; assigning a first node with a highest weight to a first layer of the graph; and for each given node other than the first node: determining relationships of the given node to assigned nodes; determining an assigned layer for the given node based on the determined weights and the relationships of the given node to assigned nodes; and assigning the given node to the assigned layer.

The foregoing and other described implementations can each optionally include one or more of the following features:

A first feature, combinable with any of the following features, wherein determining the relationships of the given node to assigned nodes comprises: determining whether the given node is a source node of at least one assigned target node that has been assigned to a layer of the graph; and determining whether the given node is a target node of at least one assigned source node that has been assigned to a layer of the graph.

A second feature, combinable with any of the previous or following features, wherein determining the assigned layer comprises: determining a set of candidate layers; and determining the assigned layer from the set of candidate layers.

A third feature, combinable with any of the previous or following features, wherein determining the assigned layer comprises: determining that the given node is not a target node of an assigned source node and is not a source node of an assigned target node; and determining the candidate layers to be all layers of the graph.

A fourth feature, combinable with any of the previous or following features, wherein determining the assigned layer comprises: determining that the given node is a source node to at least one assigned target node and a target node to at least one assigned source node; determining that there is not a free layer between a lowest assigned target node and a highest assigned source node; adding a new layer between the lowest assigned target node and the highest assigned source node; and determining the assigned layer to be the new layer.

A fifth feature, combinable with any of the previous or following features, wherein determining the assigned layer comprises: determining that the given node is a source node to at least one assigned target node and a target node to at least one assigned source node; determining that there is a free layer between a lowest assigned target node and a highest assigned source node; and determining the candidate layers to be layers of the graph that are between the lowest assigned target node and the highest assigned source node.

A sixth feature, combinable with any of the previous or following features, wherein determining the assigned layer comprises: determining that the given node is a source node to at least one assigned target node and is not a target node to an assigned source node; determining that a lowest assigned target node is on a lowest layer of the graph; adding a new layer at the bottom of the graph; and determining the assigned layer to be the new layer.

A seventh feature, combinable with any of the previous or following features, wherein determining the assigned layer comprises: determining that the given node is a source node to at least one assigned target node and is not a target node to an assigned source node; determining that a lowest assigned target node is not on a lowest layer of the graph; and determining the candidate layers to be layers of the graph between the lowest layer of the graph and the lowest assigned target node.

An eighth feature, combinable with any of the previous or following features, wherein determining the assigned layer comprises: determining that the given node is not a source node to an assigned target node and is a target node to at least one assigned source node; determining that a highest assigned source node is on a highest layer of the graph; adding a new layer to the top of the graph; and determining the assigned layer to be the new layer.

A ninth feature, combinable with any of the previous or following features, wherein determining the assigned layer comprises: determining that the given node is not a source node to an assigned target node and is a target node to at least one assigned source node; determining that a highest assigned source node is not on a highest layer of the graph; and determining the candidate layers to be layers of the graph between the highest layer of the graph and the highest assigned source node.

A tenth feature, combinable with any of the previous or following features, wherein determining the assigned layer from the set of candidate layers comprises:

determining that the given node has an associated weight and that one or more candidate layers have a weight equal to the weight associated with the given node; and determining the assigned layer to be the lowest candidate layer having a weight equal to the weight associated with the given node.

An eleventh feature, combinable with any of the previous or following features, wherein determining the assigned layer from the set of candidate layers comprises: determining whether a weight can be determined for the given node; in response to determining that a weight cannot be determined for the given node, determining the assigned layer to be a top layer of the graph; and in response to determining that a weight can be determined for the given node: determining a weight for the given node; determining a weight list that includes a list weight for each candidate layer; and determining the assigned layer based on the determined weight of the given node and the weight list.

A twelfth feature, combinable with any of the previous or following features, wherein assigning the given node to a layer comprises: identifying unassigned target nodes of the given node; and assigning each unassigned target node of the given node to a layer using a recursive process for each unassigned target node.

A thirteenth feature, combinable with any of the previous features, wherein a weight for a given node is determined based on the type of the node.

In a second implementation, non-transitory, computer-readable medium stores one or more instructions executable by a computer system to perform operations comprising: identifying node information for a set of nodes to display on a graph, the node information including metadata and relationship information, the relationship information indicating, for each relationship, a source node and a target node for the relationship; determining weights for the nodes based on the metadata associated with the nodes; sorting the nodes based on the determined weights; assigning a first node with a highest weight to a first layer of the graph; and for each given node other than the first node: determining relationships of the given node to assigned nodes; determining an assigned layer for the given node based on the determined weights and the relationships of the given node to assigned nodes; and assigning the given node to the assigned layer.

The foregoing and other described implementations can each optionally include one or more of the following features:

A first feature, combinable with any of the following features, wherein determining the relationships of the given node to assigned nodes comprises: determining whether the given node is a source node of at least one assigned target node that has been assigned to a layer of the graph; and determining whether the given node is a target node of at least one assigned source node that has been assigned to a layer of the graph.

A second feature, combinable with any of the previous or following features, wherein determining the assigned layer comprises: determining a set of candidate layers; and determining the assigned layer from the set of candidate layers.

A third feature, combinable with any of the previous or following features, wherein determining the assigned layer comprises: determining that the given node is not a target node of an assigned source node and is not a source node of an assigned target node; and determining the candidate layers to be all layers of the graph.

A fourth feature, combinable with any of the previous or following features, wherein determining the assigned layer comprises: determining that the given node is a source node to at least one assigned target node and a target node to at least one assigned source node; determining that there is not a free layer between a lowest assigned target node and a highest assigned source node; adding a new layer between the lowest assigned target node and the highest assigned source node; and determining the assigned layer to be the new layer.

A fifth feature, combinable with any of the previous or following features, wherein determining the assigned layer comprises: determining that the given node is a source node to at least one assigned target node and a target node to at least one assigned source node; determining that there is a free layer between a lowest assigned target node and a highest assigned source node; and determining the candidate layers to be layers of the graph that are between the lowest assigned target node and the highest assigned source node.

A sixth feature, combinable with any of the previous or following features, wherein determining the assigned layer comprises: determining that the given node is a source node to at least one assigned target node and is not a target node to an assigned source node; determining that a lowest assigned target node is on a lowest layer of the graph; adding a new layer at the bottom of the graph; and determining the assigned layer to be the new layer.

A seventh feature, combinable with any of the previous or following features, wherein determining the assigned layer comprises: determining that the given node is a source node to at least one assigned target node and is not a target node to an assigned source node; determining that a lowest assigned target node is not on a lowest layer of the graph; and determining the candidate layers to be layers of the graph between the lowest layer of the graph and the lowest assigned target node.

An eighth feature, combinable with any of the previous or following features, wherein determining the assigned layer comprises: determining that the given node is not a source node to an assigned target node and is a target node to at least one assigned source node; determining that a highest assigned source node is on a highest layer of the graph; adding a new layer to the top of the graph; and determining the assigned layer to be the new layer.

A ninth feature, combinable with any of the previous or following features, wherein determining the assigned layer comprises: determining that the given node is not a source node to an assigned target node and is a target node to at least one assigned source node; determining that a highest assigned source node is not on a highest layer of the graph; and determining the candidate layers to be layers of the graph between the highest layer of the graph and the highest assigned source node.

A tenth feature, combinable with any of the previous or following features, wherein determining the assigned layer from the set of candidate layers comprises:

determining that the given node has an associated weight and that one or more candidate layers have a weight equal to the weight associated with the given node; and determining the assigned layer to be the lowest candidate layer having a weight equal to the weight associated with the given node.

An eleventh feature, combinable with any of the previous or following features, wherein determining the assigned layer from the set of candidate layers comprises: determining whether a weight can be determined for the given node; in response to determining that a weight cannot be determined for the given node, determining the assigned layer to be a top layer of the graph; and in response to determining that a weight can be determined for the given node: determining a weight for the given node; determining a weight list that includes a list weight for each candidate layer; and determining the assigned layer based on the determined weight of the given node and the weight list.

A twelfth feature, combinable with any of the previous or following features, wherein assigning the given node to a layer comprises: identifying unassigned target nodes of the given node; and assigning each unassigned target node of the given node to a layer using a recursive process for each unassigned target node.

A thirteenth feature, combinable with any of the previous features, wherein a weight for a given node is determined based on the type of the node.

In a third implementation, a computer-implemented system comprises a computer memory and a hardware processor. The hardware processor is interoperably coupled with the computer memory and configured to perform operations comprising: identifying node information for a set of nodes to display on a graph, the node information including metadata and relationship information, the relationship information indicating, for each relationship, a source node and a target node for the relationship; determining weights for the nodes based on the metadata associated with the nodes; sorting the nodes based on the determined weights; assigning a first node with a highest weight to a first layer of the graph; and for each given node other than the first node: determining relationships of the given node to assigned nodes; determining an assigned layer for the given node based on the determined weights and the relationships of the given node to assigned nodes; and assigning the given node to the assigned layer The foregoing and other described implementations can each optionally include one or more of the following features:

A first feature, combinable with any of the following features, wherein determining the relationships of the given node to assigned nodes comprises: determining whether the given node is a source node of at least one assigned target node that has been assigned to a layer of the graph; and determining whether the given node is a target node of at least one assigned source node that has been assigned to a layer of the graph.

A second feature, combinable with any of the previous or following features, wherein determining the assigned layer comprises: determining a set of candidate layers; and determining the assigned layer from the set of candidate layers.

A third feature, combinable with any of the previous or following features, wherein determining the assigned layer comprises: determining that the given node is not a target node of an assigned source node and is not a source node of an assigned target node; and determining the candidate layers to be all layers of the graph.

A fourth feature, combinable with any of the previous or following features, wherein determining the assigned layer comprises: determining that the given node is a source node to at least one assigned target node and a target node to at least one assigned source node; determining that there is not a free layer between a lowest assigned target node and a highest assigned source node; adding a new layer between the lowest assigned target node and the highest assigned source node; and determining the assigned layer to be the new layer.

A fifth feature, combinable with any of the previous or following features, wherein determining the assigned layer comprises: determining that the given node is a source node to at least one assigned target node and a target node to at least one assigned source node; determining that there is a free layer between a lowest assigned target node and a highest assigned source node; and determining the candidate layers to be layers of the graph that are between the lowest assigned target node and the highest assigned source node.

A sixth feature, combinable with any of the previous or following features, wherein determining the assigned layer comprises: determining that the given node is a source node to at least one assigned target node and is not a target node to an assigned source node; determining that a lowest assigned target node is on a lowest layer of the graph; adding a new layer at the bottom of the graph; and determining the assigned layer to be the new layer.

A seventh feature, combinable with any of the previous or following features, wherein determining the assigned layer comprises: determining that the given node is a source node to at least one assigned target node and is not a target node to an assigned source node; determining that a lowest assigned target node is not on a lowest layer of the graph; and determining the candidate layers to be layers of the graph between the lowest layer of the graph and the lowest assigned target node.

An eighth feature, combinable with any of the previous or following features, wherein determining the assigned layer comprises: determining that the given node is not a source node to an assigned target node and is a target node to at least one assigned source node; determining that a highest assigned source node is on a highest layer of the graph; adding a new layer to the top of the graph; and determining the assigned layer to be the new layer.

A ninth feature, combinable with any of the previous or following features, wherein determining the assigned layer comprises: determining that the given node is not a source node to an assigned target node and is a target node to at least one assigned source node; determining that a highest assigned source node is not on a highest layer of the graph; and determining the candidate layers to be layers of the graph between the highest layer of the graph and the highest assigned source node.

A tenth feature, combinable with any of the previous or following features, wherein determining the assigned layer from the set of candidate layers comprises:

determining that the given node has an associated weight and that one or more candidate layers have a weight equal to the weight associated with the given node; and determining the assigned layer to be the lowest candidate layer having a weight equal to the weight associated with the given node.

An eleventh feature, combinable with any of the previous or following features, wherein determining the assigned layer from the set of candidate layers comprises: determining whether a weight can be determined for the given node; in response to determining that a weight cannot be determined for the given node, determining the assigned layer to be a top layer of the graph; and in response to determining that a weight can be determined for the given node: determining a weight for the given node; determining a weight list that includes a list weight for each candidate layer; and determining the assigned layer based on the determined weight of the given node and the weight list.

A twelfth feature, combinable with any of the previous or following features, wherein assigning the given node to a layer comprises: identifying unassigned target nodes of the given node; and assigning each unassigned target node of the given node to a layer using a recursive process for each unassigned target node.

A thirteenth feature, combinable with any of the previous features, wherein a weight for a given node is determined based on the type of the node.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    identifying node information for a set of nodes to display on a graph, the node information including metadata and relationship information, the relationship information indicating, for each relationship, a source node and a target node for the relationship, wherein each node represents a data object of a computer-based system, wherein data object types include a data source object type that represents an entry point at which data enters a computer-based system, a data store object type that represents storage of data in the computer-based system, and an information source object type that represents an interface for a data flow within the computer-based system;
    determining weights for the nodes based on the metadata associated with the nodes, including determining a weight of a sourceless node that represents a first data object that does not have a defined source;
    sorting the nodes based on the determined weights;
    assigning a first node with a highest weight to a first vertical layer of the graph, wherein a vertical layer indicates a vertical position of a node within the graph;
    assigning a layer to the sourceless node based on the weight of the sourceless node; and
    for each given node of the nodes other than the first node and the sourceless node:
        determining relationships of the given node to assigned nodes, wherein each assigned node of the assigned nodes has been assigned to a vertical layer;
        determining an assigned vertical layer for the given node based on the determined weights and the relationships of the given node to assigned nodes; and
        assigning the given node to the assigned vertical layer.

2. The method of claim 1, wherein determining the relationships of the given node to assigned nodes comprises:
    determining whether the given node is a source node of at least one assigned target node that has been assigned to a vertical layer of the graph; and
    determining whether the given node is a target node of at least one assigned source node that has been assigned to a vertical layer of the graph.

3. The method of claim 2, wherein determining the assigned vertical layer comprises:
    determining a set of candidate vertical layers; and
    determining the assigned vertical layer from the set of candidate vertical layers.

4. The method of claim 3, wherein determining the assigned vertical layer comprises:
    determining that the given node is not a target node of an assigned source node and that the given node is not a source node of an assigned target node; and
    determining the candidate vertical layers to be all vertical layers of the graph.

5. The method of claim 3, wherein determining the assigned vertical layer comprises:
    determining that the given node is a source node to at least one assigned target node and that the given node is a target node to at least one assigned source node;
    determining that there is a free vertical layer between a lowest assigned target node and a highest assigned source node; and
    determining the candidate vertical layers to be vertical layers of the graph that are between the lowest assigned target node and the highest assigned source node.

6. The method of claim 3, wherein determining the assigned vertical layer comprises:
    determining that the given node is a source node to at least one assigned target node and that the given node is not a target node to an assigned source node;
    determining that a lowest assigned target node is not on a lowest vertical layer of the graph; and
    determining the candidate vertical layers to be vertical layers of the graph between the lowest vertical layer of the graph and the lowest assigned target node.

7. The method of claim 3, wherein determining the assigned vertical layer comprises:
    determining that the given node is not a source node to an assigned target node and that the given node is a target node to at least one assigned source node;
    determining that a highest assigned source node is not on a highest vertical layer of the graph; and
    determining the candidate vertical layers to be vertical layers of the graph between the highest vertical layer of the graph and the highest assigned source node.

8. The method of claim 3, wherein determining the assigned vertical layer from the set of candidate vertical layers comprises:
    determining that the given node has an associated weight and that one or more candidate layers have a weight equal to the weight associated with the given node; and
    determining the assigned vertical layer to be the lowest candidate vertical layer having a weight equal to the weight associated with the given node.

9. The method of claim 3, wherein determining the assigned vertical layer from the set of candidate vertical layers comprises:
  determining whether a weight can be determined for the given node;
  in response to determining that a weight cannot be determined for the given node, determining the assigned vertical layer to be a top vertical layer of the graph; and
  in response to determining that a weight can be determined for the given node:
    determining a weight for the given node;
    determining a weight list that includes a list weight for each candidate vertical layer; and
    determining the assigned vertical layer based on the determined weight of the given node and the weight list.

10. The method of claim 2, wherein determining the assigned vertical layer comprises:
  determining that the given node is a source node to at least one assigned target node and a target node to at least one assigned source node;
  determining that there is not a free vertical layer between a lowest assigned target node and a highest assigned source node;
  adding a new vertical layer between the lowest assigned target node and the highest assigned source node; and
  determining the assigned vertical layer to be the new vertical layer.

11. The method of claim 2, wherein determining the assigned vertical layer comprises:
  determining that the given node is a source node to at least one assigned target node and that the given node is not a target node to an assigned source node;
  determining that a lowest assigned target node is on a lowest vertical layer of the graph;
  adding a new vertical layer at the bottom of the graph; and
  determining the assigned vertical layer to be the new vertical layer.

12. The method of claim 2, wherein determining the assigned vertical layer comprises:
  determining that the given node is not a source node to an assigned target node and that the given node is a target node to at least one assigned source node;
  determining that a highest assigned source node is on a highest vertical layer of the graph;
  adding a new vertical layer to the top of the graph; and
  determining the assigned vertical layer to be the new vertical layer.

13. The method of claim 1, wherein assigning the given node to a vertical layer comprises:
  identifying unassigned target nodes of the given node; and
  assigning each unassigned target node of the given node to a vertical layer using a recursive process for each unassigned target node.

14. The method of claim 1, wherein a weight for a given node is determined based on the type of the node.

15. A non-transitory, computer-readable medium storing one or more instructions executable by a computer system to perform operations comprising:
  identifying node information for a set of nodes to display on a graph, the node information including metadata and relationship information, the relationship information indicating, for each relationship, a source node and a target node for the relationship, wherein each node represents a data object of a computer-based system, wherein data object types include a data source object type that represents an entry point at which data enters a computer-based system, a data store object type that represents storage of data in the computer-based system, and an information source object type that represents an interface for a data flow within the computer-based system;
  determining weights for the nodes based on the metadata associated with the nodes, including determining a weight of a sourceless node that represents a first data object that does not have a defined source;
  sorting the nodes based on the determined weights;
  assigning a first node with a highest weight to a first vertical layer of the graph, wherein a vertical layer indicates a vertical position of a node within the graph;
  assigning a layer to the sourceless node based on the weight of the sourceless node; and
  for each given node of the nodes other than the first node and the sourceless node:
    determining relationships of the given node to assigned nodes, wherein each assigned node of the assigned nodes has been assigned to a vertical layer;
    determining an assigned vertical layer for the given node based on the determined weights and the relationships of the given node to assigned nodes; and
    assigning the given node to the assigned vertical layer.

16. The non-transitory, computer-readable medium of claim 15, wherein determining the relationships of the given node to assigned nodes comprises:
  determining whether the given node is a source node of at least one assigned target node that has been assigned to a vertical layer of the graph; and
  determining whether the given node is a target node of at least one assigned source node that has been assigned to a vertical layer of the graph.

17. The non-transitory, computer-readable medium of claim 15, wherein a weight for a given node is determined based on the type of the node.

18. A computer-implemented system, comprising:
  a computer memory; and
  a hardware processor interoperably coupled with the computer memory and configured to perform operations comprising:
    identifying node information for a set of nodes to display on a graph, the node information including metadata and relationship information, the relationship information indicating, for each relationship, a source node and a target node for the relationship, wherein each node represents a data object of a computer-based system, wherein data object types include a data source object type that represents an entry point at which data enters a computer-based system, a data store object type that represents storage of data in the computer-based system, and an information source object type that represents an interface for a data flow within the computer-based system;
    determining weights for the nodes based on the metadata associated with the nodes, including determining a weight of a sourceless node that represents a first data object that does not have a defined source;
    sorting the nodes based on the determined weights;
    assigning a first node with a highest weight to a first vertical layer of the graph, wherein a vertical layer indicates a vertical position of a node within the graph;
    assigning a layer to the sourceless node based on the weight of the sourceless node; and for each given node of the nodes other than the first node and the sourceless node:
  determining relationships of the given node to assigned nodes, wherein each assigned node of the assigned nodes has been assigned to a vertical layer;
  determining an assigned vertical layer for the given node based on the determined weights and the relationships of the given node to assigned nodes; and
  assigning the given node to the assigned vertical layer.

19. The computer-implemented system of claim 18, wherein a weight for a given node is determined based on the type of the node.

20. The computer-implemented system of claim 18, wherein determining the relationships of the given node to assigned nodes comprises:
  determining whether the given node is a source node of at least one assigned target node that has been assigned to a vertical layer of the graph; and
  determining whether the given node is a target node of at least one assigned source node that has been assigned to a vertical layer of the graph.

* * * * *